(12) United States Patent
Garaj et al.

(10) Patent No.: US 11,938,451 B2
(45) Date of Patent: Mar. 26, 2024

(54) GRAPHENE-BASED MEMBRANE AND METHOD OF PREPARATION THEREOF

(71) Applicant: National University of Singapore, Singapore (SG)

(72) Inventors: Slaven Garaj, Singapore (SG); Seunghyun Hong, Singapore (SG)

(73) Assignee: National University of Singapore, Singapore (SG)

( * ) Notice: Subject to any disclaimer, the term of this patent is extended or adjusted under 35 U.S.C. 154(b) by 111 days.

(21) Appl. No.: 16/854,176

(22) Filed: Apr. 21, 2020

(65) Prior Publication Data
US 2020/0276543 A1 Sep. 3, 2020

Related U.S. Application Data

(62) Division of application No. 15/360,543, filed on Nov. 23, 2016, now abandoned.

(60) Provisional application No. 62/386,274, filed on Nov. 24, 2015.

(51) Int. Cl.
| | | |
|---|---|---|
| B01D 71/02 | (2006.01) | |
| B01D 67/00 | (2006.01) | |
| B01D 69/02 | (2006.01) | |
| B01D 69/10 | (2006.01) | |

(52) U.S. Cl.
CPC ....... *B01D 71/021* (2013.01); *B01D 67/0041* (2013.01); *B01D 69/02* (2013.01); *B01D 69/10* (2013.01); *B01D 2323/35* (2013.01)

(58) Field of Classification Search
CPC ........... B01D 2323/35; B01D 67/0041; B01D 69/02; B01D 69/10; B01D 71/021
See application file for complete search history.

(56) References Cited

U.S. PATENT DOCUMENTS

| | | | |
|---|---|---|---|
| 2011/0041519 A1 | 2/2011 | McAlister | |
| 2013/0153426 A1* | 6/2013 | Sun | C02F 1/4691 977/734 |
| 2013/0256211 A1* | 10/2013 | Fleming | C02F 1/44 210/321.76 |
| 2014/0069277 A1 | 3/2014 | Choi | |
| 2015/0258506 A1* | 9/2015 | Mi | B01D 69/12 156/273.1 |

(Continued)

OTHER PUBLICATIONS

Park, S. et al. Graphene Oxide Papers Modified by Divalent Ions—Enhancing Mechanical Properties via Chemical Cross-Linking. ACS Nano 2, 572-578 (2008).

(Continued)

*Primary Examiner* — Dirk R Bass
(74) *Attorney, Agent, or Firm* — Michael Best & Friedrich LLP

(57) ABSTRACT

A method of preparing a graphene-based membrane is provided. The method may include providing a stacked arrangement of layers of a graphene-based material, wherein the layers of the graphene-based material define one or more nanochannels between neighboring layers, and varying an electrical charge on a surface of the layers of the graphene-based material defining the one or more nanochannels to control size selectivity and/or ionic selectivity of the graphene-based membrane. A graphene-based membrane and a method of separating ions from a fluid stream are also provided.

9 Claims, 25 Drawing Sheets

(56) References Cited

U.S. PATENT DOCUMENTS

2015/3077830    12/2015    Baldauf

OTHER PUBLICATIONS

Toby, B. Expgui, a graphical user interface for GSAS. J. Appl. Cryst. 34, 210-213 (2001).
Kim, D.-K., Duan, C., Chen, Y.-F. & Majumdar, A. Power generation from concentration gradient by reverse electrodialysis in ion-selective nanochannels. Microfluids Nanofluids 9, 1215-1224 (2010).
Joshi, R. K. et al. Precise and Ultrafast Molecular Sieving Through Graphene Oxide Membranes. Science 343, 752-754 (2014).
Nair, R. R., Wu, H. A., Jayaram, P. N., Grigorieva, I. V. & Geim, A. K. Unimpeded Permeation of Water Through Helium-Leak-Tight Graphene-Based Membranes. Science 335, 442-444 (2012).
Yang, X. et al. Ordered Gelation of Chemically Converted Graphene for Next-Generation Electroconductive Hydrogel Films. Angew. Chem. 50, 7325-7328 (2011).
Hoogerheide, D. P., Garaj, S. & Golovchenko, J. A. Probing Surface Charge Fluctuations with Solid-State Nanopores. Phys. Rev. Lett. 102, 256804 (2009).
Behrens, S. H. & Grier, D. G. The charge of glass and silica surfaces. J. Chem. Phys. 115, 6716-6721 (2001).
Schoch, R. B., Han, J. & Renaud, P. Transport phenomena in nanofluidics. Rev. Mod. Phys. 80, 839-883 (2008).
Cohen-Tanugi, D. & Grossman, J. C. Water Desalination across Nanoporous Graphene. Nano Lett. 12, 3602-3608 (2012).
Garaj, S. et al. Graphene as a subnanometre trans-electrode membrane. Nature 467, 190-193 (2010).
O'Hern, S. C. et al. Selective Molecular Transport through Intrinsic Defects in a Single Layer of CVD Graphene. ACS Nano 6, 10130-10138 (2012).
Celebi, K. et al. Ultimate permeation across atomically thin porous graphene. Science 344, 289-292 (2014).
Surwade, S. P. et al. Water desalination using nanoporous single-layer graphene. Nat. Nanotech. 10, 459-464 (2015).
Sint, Kyaw et al. Water desalination using nanoporous single-layer graphene. Nat. Nanotech. 10, 459-464 (2015).
Li, H. et al. Ultrathin, Molecular-Sieving Graphene Oxide Membranes for Selective Hydrogen Separation. Science 342, 95-98 (2013).
Kim, H. W. et al. Selective Gas Transport Through Few-Layered Graphene and Graphene Oxide Membranes. Science 342, 91-95 (2013).
Raidongia, K. & Huang, J. Nanofluidic Ion Transport through Reconstructed Layered Materials. J Am Chem Soc 134, 16528-16531 (2012).
Qiu, L. et al. Controllable Corrugation of Chemically Converted Graphene Sheets in Water and Potential Application for Nanofiltration. Chem. Commun. 47, 5810-5812 (2011).
Han, Y., Xu, Z. & Gao, C. Ultrathin Graphene Nanofiltration Membrane for Water Purification. Adv. Funct. Mater. 23, 3693-3700 (2013).
Hu, M. & Mi, B. Enabling Graphene Oxide Nanosheets as Water Separation Membranes. Environ. Sci. Technol. 47, 3715-3723 (2013).
Dikin, D. A. et al. Preparation and characterization of graphene oxide paper. Nature 448, 457-460 (2007).
Eda, G. & Chhowalla, M. Chemically Derived Graphene Oxide: Towards Large-Area Thin-Film Electronics and Optoelectronics. Adv. Mater. 22, 2392-2415 (2010).
Elimelech, M. & Phillip, W. A. The Future of Seawater Desalination: Energy, Technology, and the Environment. Science 333, 712-717 (2011).
Pendergast, M. M. & Hoek, E. M. V. A review of water treatment membrane nanotechnologies. Energy Environ. Sci. 4, 1946-1971 (2011).
Liu, G., Jin, W. & Xu, N. Graphene-based membranes. Chem. Soc. Rev. 44, 5016-5030 (2015).
Lee, A., Elam, J. W. & Darling, S. B. Membrane materials for water purification: design, development, and application. Environ. Sci.: Water Res. Technol. 2, 17-42 (2016).
Boukhvalov, D. W., Katsnelson, M. I. & Son, Y.-W. Origin of Anomalous Water Permeation through Graphene Oxide Membrane. Nano Lett. 13, 3930-3935 (2013).
Sun, P. et al. Selective Ion Transport through Functionalized Graphene Membranes Based on Delicate Ion-Graphene Interactions. J. Phys. Chem. C 118, 19396-19401 (2014).
Sun, P. et al. Selective Ion Penetration of Graphene Oxide Membranes. ACS Nano 7, 428-437 (2013).
Sun, P. et al. Selective Trans-Membrane Transport of Alkali and Alkaline Earth Cations through Graphene Oxide Membranes Based on Cation-πInteractions. ACS Nano 8, 850-859 (2014).
Marcus, Y. A Simple Empirical-Model Describing the Thermodynamics of Hydration of Ions of Widely Varying Charges, Sizes, and Shapes. Biophys. Chem. 51, 111-127 (1994).
Zwolak, M., Lagerqvist, J. & Di Ventra, M. Quantized Ionic Conductance in Nanopores. Phys. Rev. Lett. 103, 128102 (2009).
Shklovskii, B.I., Screening of a macroion by multivalent ions: Correlation-induced inversion of charge, Theoretical Physics Institute, University of Minnesota, 60, 5802-5811 (1999).
Aguilella, V. M., Queralt-Martin, M., Aguilella-Arzo, M. & Alcaraz, A. Insights on the permeability of wide protein channels: measurement and interpretation of ion selectivity. Integr. Biol. 3, 159-172 (2011).
Huang, H. et al., Ultrafast Viscous Water Flow through Nanostrand-channelled Graphene Oxide Membranes. Nat. Comm. 4, 2979 (2013).
Ying, Y., Sun, L., Wang, Q., Fan, Z., and Peng, X. In-plane Mesoporous Graphene Oxide Nanosheet assembled Membranes for Molecular Separation. RSC Adv. 4, 21425-21428 (2014).
Sun, P. et al., Electro- and Magneto-Modulated Ion Transport through Graphene Oxide Membranes. Scientific Reports 4, Article No. 6798 (2014).
He, Z. et al., Bioinspired Graphene Nanopores with Voltage-Tunable Ion Selectivity for Na+ and K+. ACSNano 7, No. 11, pp. 10148-10157 (2013).

* cited by examiner diffusion $I_{diff} \sim (P_+ - P_-) \Delta c$ drift $I_{drift} \sim (P_+ + P_-) \Delta V$

GRAPHENE-BASED MEMBRANE AND METHOD OF PREPARATION THEREOF

CROSS-REFERENCE TO RELATED APPLICATION

This application claims the benefit of priority of U.S. Non-Provisional patent application Ser. No. 15/360,543 filed on Nov. 23, 2016 which claims the benefit of priority of U.S. Provisional Patent Application No. 62/386,274 filed on Nov. 24, 2015, the contents of both of which are incorporated herein by reference in their entirety for all purposes.

TECHNICAL FIELD

Various embodiments relate to a graphene-based membrane, method of preparing the graphene-based membrane, and method of separating ions from a fluid stream.

BACKGROUND

Water flux, ionic selectivity, ionic rejection rate, and molecular/ionic size cutoff are some of the parameters that determine performance of water filtration membranes. Improving any of these parameters may result in a better and more energy efficient filtration or desalination membrane.

Graphene-based membranes exhibiting ultra-high water flux have recently attracted significant attention as molecular and ionic sieves. Particularly, nanostructured graphene-oxide (GO) laminate membranes—scalable, inexpensive, thermally and chemically robust, and integratable with current technologies—are enticing candidates for the next generation of filtration or desalination membrane. Ionic rejection of the graphene-based membranes may be driven by geometric size exclusion, and size of nanochannels in GO membranes may be decreased to achieve a much smaller cutoff size required for application such as desalination. The improvement in ionic rejection carried out by size reduction of nanochannels in GO membranes, however, negatively impacts water flux, which affects performance of the membranes and their adoption in industry.

In view of the above, there exists a need for a membrane that exhibits improved ionic rejection and/or ion selectivity levels while achieving or maintaining acceptable water flux performance that addresses or at least alleviates one or more of the above-mentioned problems.

SUMMARY

In a first aspect, a method of preparing a graphene-based membrane is provided. The method comprises
  a) providing a stacked arrangement of layers of a graphene-based material, wherein the layers of the graphene-based material define one or more nanochannels between neighboring layers, and
  b) varying an electrical charge on a surface of the layers of the graphene-based material defining the one or more nanochannels to control size selectivity and/or ionic selectivity of the graphene-based membrane.

In a second aspect, a graphene-based membrane is provided. The graphene-based membrane comprising a stacked arrangement of layers of a graphene-based material, the layers of the graphene-based material defining one or more nanochannels between neighboring layers, wherein a surface of the layers of the graphene-based material defining the one or more nanochannels possess an electrical charge, and wherein the layers of the graphene-based material are configured to control size selectivity and/or ionic selectivity of the graphene-based membrane by varying the electrical charge.

In a third aspect, a method of separating ions from a fluid stream is provided. The method comprises
  a) providing a graphene-based membrane comprising a stacked arrangement of layers of a graphene-based material, the layers of the graphene-based material defining one or more nanochannels between neighboring layers, wherein a surface of the layers of the graphene-based material defining the one or more nanochannels possess an electrical charge, and wherein the layers of the graphene-based material are configured to control size selectivity and/or ionic selectivity of the graphene-based membrane by varying the electrical charge, and
  b) directing a fluid stream comprising one or more ions towards a first surface of the graphene-based membrane, wherein ions to be separated from the fluid stream are filtered through the graphene-based membrane.

BRIEF DESCRIPTION OF THE DRAWINGS

The invention will be better understood with reference to the detailed description when considered in conjunction with the non-limiting examples and the accompanying drawings, in which.

DETAILED DESCRIPTION

Figure 1:
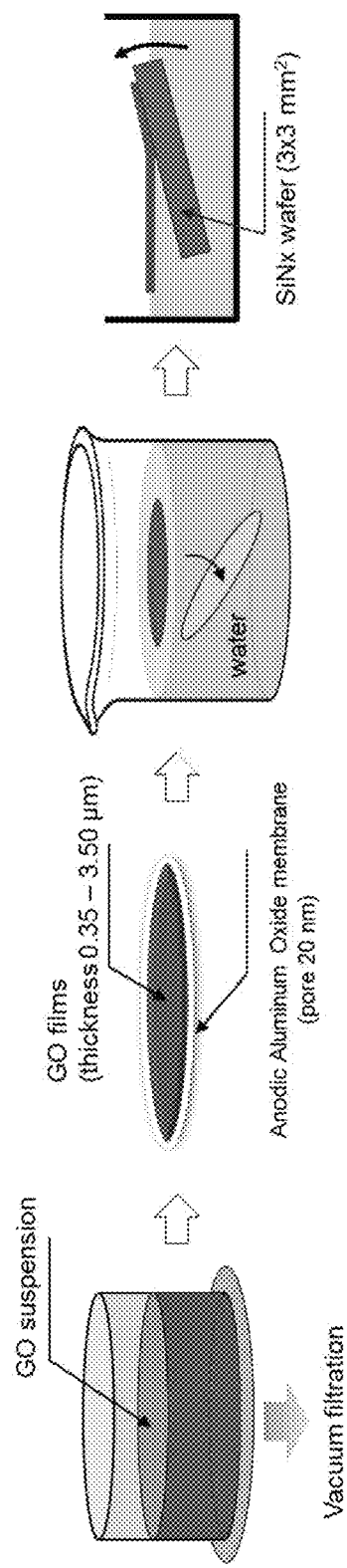
FIG. 1 is a schematic diagram showing preparation of chip-mounted graphene oxide membranes according to an embodiment.

Advantageously, by forming a stacked arrangement of layers of a graphene-based material, wherein the layers of the graphene-based material define one or more nanochannels between neighboring layers, and varying an electrical charge on a surface of the layers of the graphene-based material defining the one or more nanochannels to control size selectivity and/or ionic selectivity of the graphene-based membrane, improvements in size and/or ion rejection of the graphene-based membrane may be effected while not affecting its water flux performance unduly. The membranes disclosed herein may directly be applied as desalination membranes, nanofiltration membranes, biofiltration membranes, ion-exchange membranes, electrodialysis membranes, and filtration membranes, for use in a myriad of applications such as water purification, and pharmaceutical, chemical and fuel separation.

With the above in mind, various embodiments refer in a first aspect to a method of preparing a graphene-based membrane.

The term "membrane" as used herein refers to a semi-permeable material that selectively allows certain species to pass through it while retaining others within or on the material. A membrane therefore functions like a filter medium to permit a component separation by selectively controlling passage of the components from one side of the membrane to the other side. Examples of membrane types include hollow fiber membranes, flat-sheet membranes, spiral wound membranes, or tubular membranes. Flat-sheet membranes are formed from one or more sheets of membrane material placed adjacent to or bonded to one another. Spiral wound membranes are flat sheet membranes which are wrapped around a central collection tube. Tubular membranes and hollow fiber membranes assume the form of hollow tubes of circular cross-section, whereby the wall of the tube functions as the membrane.

The membrane disclosed herein is a graphene-based membrane. As used herein, the term "graphene-based membrane" refers to a membrane comprising or formed of graphene or a material based on graphene, such as graphene oxide, reduced graphene oxide, and derivatives of graphene. Examples of derivatives of graphene include chemically functionalized graphene sheets, intercalated graphene sheets, and graphene-based composites.

Graphene refers generally to a form of graphitic carbon, in which carbon atoms are covalently bonded to one another to form a two-dimensional sheet of bonded carbon atoms. The carbon atoms may be bonded to one another via sp$^2$ bonds, and may form a 6-membered ring as a repeating unit, and may further include a 5-membered ring and/or a 7-membered ring. In its crystalline form, two or more sheets of graphene may be stacked together to form multiple stacked layers. Generally, the side ends of graphene are saturated with hydrogen atoms.

Graphene oxide refers to oxidized forms of graphene, and may include an oxygen-containing group such as a hydroxyl group, an epoxide group, a carboxyl group, and/or a ketone group. Reduced graphene oxide refers to graphene oxide which has been subjected to a reduction process, thereby partially or substantially reducing it. For example, after subjecting the graphene oxide to a reduction process, some of the oxygen-containing groups remain in the reduced graphene oxide that is formed. The reduction process may take place via a chemical route, or by thermal treatment. By at least partially reducing graphene oxide to form reduced graphene oxide, while not reducing it to graphene, some of the oxygen-containing groups may be removed from graphene oxide thereby partially restoring the graphene $sp^2$ network. In so doing, this allows charge transfer to take place in the restored graphene network, thereby conferring electrical conductivity to the material.

Chemically functionalized graphene refers to graphene sheets containing chemical functional groups which may be covalently bonded to the basal plane or the edge of the sheets. Such groups may include, but are not limited to, di-carboxylic acid, organosulfate and/or amino groups. The chemical functional groups present on the chemically functionalized graphene may confer a different functionality to graphene-based membranes, such as: (a) ability to control surface charge in the nanochannels to render surface of the nanochannels positively charged or negatively charged; (b) ability to control height of the nanochannels; and/or (c) ability to enhance structural stability of the graphene-based membrane by cross-linking stacked graphene sheets.

Graphene composite refers to a composite formed of graphene sheets with polymers and/or nanoparticles adsorbed on a surface of the graphene sheets. Examples of polymers that may be used to form the graphene composite include, but are not limited to, polysulfone, fibroin, polyaniline, polyamide, poly(ethersulfone), deoxyribonucleic acid, mixtures thereof, and copolymers thereof. Nanoparticles, on the other hand, may include carbon nanotubes, carbon nanodots, titanium dioxide nanoparticles, and/or gold nanoparticles, to name only a few. The graphene sheets with at least one of the polymers or nanoparticles may interact with one another or be held in place in the graphene composite via non-covalent bonding, such as van der Waals bonding, hydrophobic interaction, pi-stacking, or electrostatic bonding. As in the case for chemically functionalized graphene mentioned above, modifications of the graphene sheets by forming composites with polymers or with nanoparticles may confer a different functionality to graphene-based membranes, such as: (a) ability to control surface charge in the nanochannels to render surface of the nanochannels positively charged or negatively charged; (b) ability to control height of the nanochannels; and/or (c) enhance structural stability of the graphene-based membrane by cross-linking stacked graphene sheets.

In various embodiments, the graphene-based material comprises graphene, graphene oxide, chemically functionalized graphene, or combinations thereof. In some embodiments, the graphene-based material comprises graphene oxide. In specific embodiments, the graphene-based material consist essentially of, or is formed entirely of graphene oxide.

The method comprises providing a stacked arrangement of layers of a graphene-based material. The graphene-based material may, for example, be in the form of a graphene sheet or a graphene-oxide sheet. Each of the layers of the graphene-based material may have a lateral dimension in the range of about 0.1 µm to about 10 µm, such as about 0.5 µm to about 10 µm, about 1 µm to about 10 µm, about 3 µm to about 10 µm, about 5 µm to about 10 µm, about 6 µm to about 10 µm, about 0.1 µm to about 8 µm, about 0.1 µm to about 6 µm, about 0.1 µm to about 4 µm, about 1 µm to about 6 µm, about 3 µm to about 9 µm, or about 4 µm to about 8 µm.

By the term "stacked arrangement", it is meant that at least two layers of the graphene-based material are arranged in proximity to each another such that at least a portion of a surface of the two layers overlap. The at least two layers of the graphene-based material may be spaced apart by a distance to each other. In so doing, the layers of the graphene-based material may define one or more nanochannels between neighboring layers, wherein the term "nanochannel" as used herein refers to a conduit, channel, or a similar structure having at least one dimension that is at a nanometer scale, and through which a fluid such as a liquid may pass through.

By forming a stacked arrangement of layers of a graphene-based material, this allows the graphene-based material to function as a membrane. For example, the graphene-based membrane may be formed from graphene sheets. Even though the graphene sheets may be impermeable to fluid flow therethrough, a stacked arrangement of the graphene sheets may define one or more nanochannels between neighboring layers, through which a fluid such as a liquid may pass through.

The cross-sectional width of the one or more nanochannel defined by the neighboring layers of the graphene-based material may depend on or correspond to the distance between the neighboring layers. For example, the neighboring layers of the graphene-based material may be spaced apart by a distance in the range of about 0.5 nm to about 2 nm, such as about 0.8 nm to about 2 nm, about 1 nm to about 2 nm, about 1.5 nm to about 2 nm, about 0.5 nm to about 1.8 nm, about 0.5 nm to about 1.5 nm, about 0.5 nm to about 1.2 nm, about 0.9 nm to about 1.2 nm, about 0.9 nm to about 1 nm, about 1 nm to about 1.1 nm, or about 0.95 nm to about 1.15 nm. Accordingly in various embodiments, each of the one or more nanochannels may have a maximal cross-sectional width in the range of about 0.5 nm to about 2 nm, or a maximal cross-sectional width corresponding to a spacing distance between the neighboring layers of the graphene-based material mentioned above.

In various embodiments, providing the stacked arrangement of layers of a graphene-based material comprises providing a suspension comprising layers of the graphene-based material dispersed therein, filtering the suspension through a porous substrate to dispose the layers of the graphene-based material as a stacked arrangement on the porous substrate, and separating the stacked arrangement of layers of the graphene-based material from the porous substrate.

Providing the suspension comprising layers of the graphene-based material dispersed therein may comprise sonicating a dispersion comprising the graphene-based material to exfoliate the graphene-based material into layers. As used herein, the term "exfoliate" refers to a process by which a layered or stacked structure is transformed to one that is substantially de-laminated, disordered, and/or no longer stacked. By sonicating a dispersion comprising the graphene-based material, for example, layers of the graphene-based material, which may be held together by van der Waals bonding in a layered structure, may be separated into their individual layers. In so doing, individual layers of the graphene-based material may be at least substantially uniformly dispersed in the suspension.

In order that the suspension may comprise or largely comprise individual layers or monolayers of the graphene-based material, the method disclosed herein may include removing graphene-based material which remain as multi-layer crystals from the dispersion following sonication to obtain the suspension. This may be carried out, for example, by centrifuging the dispersion.

The suspension may be filtered through a porous substrate to dispose the layers of the graphene-based material as a stacked arrangement on the porous substrate. The porous substrate may, for example, be anodisc alumina membrane (AAO), carbon foam, ceramic membrane, or polymeric membranes such as, but not limited to, membranes formed from polycarbonate (PC), polyvinylidene fluoride (PVDF), polysulfone (PSF), polyacrylonitrile (PAN), polyethersulfone (PES), polytetrafluoroethylene (PTFE), polyamide (PA), mixtures thereof, or copolymers thereof. To shorten the time for forming the stacked arrangement, a vacuum may be applied to the porous substrate so as to increase the rate at which the suspension is being drawn through the porous substrate.

Upon forming the stacked arrangement of layers of the graphene-based material, the stacked arrangement of layers of the graphene-based material may be separated from the porous substrate. This may be carried out, for example, by immersing the porous substrate comprising the stacked arrangement of layers of the graphene-based material disposed thereon in a liquid reagent such as water. In so doing, the stacked arrangement of layers of the graphene-based material may separate from the porous substrate, and may float on a surface of the liquid reagent to form a free-standing graphene-based membrane.

In addition to, or apart from the above-mentioned, providing the stacked arrangement of layers of a graphene-based material may be carried out by a deposition technique selected from the group consisting of spray coating, drop casting, spin-casting, doctor-blade casting, Langmuir-Blodgett, layer-by-layer assembly and combinations thereof.

The stacked arrangement of layers of the graphene-based material may be arranged on a supporting substrate to improve mechanical strength of the resulting membrane. For example, the supporting substrate may be a porous substrate having a porosity and/or pore size that does not affect liquid flux through the graphene-based membrane.

In various embodiments, the supporting substrate is a membrane formed of a material selected from the group consisting of $SiN_x$, carbon foam, ceramic membrane, and polymeric membrane. Examples of a polymeric membrane that may be used include, but are not limited to, polycarbonate (PC), polyvinylidene fluoride (PVDF), polysulfone (PSF), polyacrylonitrile (PAN), polyethersulfone (PES), polytetrafluoroethylene (PTFE), and polyamide (PA). In some embodiments, the supporting substrate is a membrane formed of $SiN_x$.

In some embodiments, the membrane of the supporting substrate comprises an array of nanopores. By limiting the exposed membrane area to a small area such as 2.5 $\mu m^2$ or less, while keeping the graphene-based membrane relatively thick, it may avoid degradation of the graphene-based membrane due to unintended cracks and defects.

In various embodiments, the stacked arrangement of layers of the graphene-based material may be configured such that the resultant graphene-based membrane assume different geometries, such as hollow fiber membranes, flat-sheet membranes, spiral wound membranes, or tubular membranes. In the case of a hollow fiber membrane, for example, the stacked arrangement of layers of the graphene-based material may be arranged on a cylindrical supporting substrate, so that a hollow fiber membrane is obtained.

The method of preparing a graphene-based membrane disclosed herein further comprises varying an electrical charge on a surface of the layers of the graphene-based material defining the one or more nanochannels to control size selectivity and/or ionic selectivity of the graphene-based membrane.

In various embodiments, varying an electrical charge on a surface of the layers of the graphene-based material defining the one or more nanochannels comprises at least one of (i) varying polarity of the electrical charge; (ii) varying magnitude of the electrical charge, or (iii) arranging layers of opposite electrical charges in the stacked arrangement.

For example, varying polarity of the electrical charge on a surface of the layers of the graphene-based material defining the one or more nanochannels may involve converting negatively charged surface groups such as carboxyl groups, $—SO^{3-}$, and/or hydroxyl groups that may be present on a surface of the graphene-based material to positively charged surface groups such as amino groups and/or trialkylammonium groups. One example by which this may be carried out is amide synthesis from carboxylic acid via carbodiimide-mediated amidation. In so doing, rejection rate of the graphene-based membrane to cations over that of anions may be increased.

Varying magnitude of the electrical charge on a surface of the layers of the graphene-based material defining the one or more nanochannels may involve increasing magnitude of the electrical charge. This may allow anion/cation selectivity and selectivity based on ionic valence to be increased. Advantageously, ion rejections may be increased, while retaining size-selected permeation of neutral molecular species.

Arranging layers of opposite electrical charges in the stacked arrangement may comprise interlaying positively and negatively charged layers of the graphene-based material in the stacked arrangement. In so doing, a tandem structure of negatively and positively charged layers of the graphene-based material may result. Size-cutoff for both anions and cations has been found by the inventors to increase significantly without lowering water permeability that may otherwise result from changing size of nanochannels within the membrane.

The above-mentioned ways in which an electrical charge on a surface of the layers of the graphene-based material defining the one or more nanochannels is varied may be carried out by at least one of (i) a chemical substitution process on the graphene-based material, (ii) a reduction process on the graphene-based material, which may be carried out chemically and/or thermally, or (iii) contacting the graphene-based material with a liquid reagent and varying molarity and/or pH of the liquid reagent.

For example, varying an electrical charge on a surface of the layers of the graphene-based material defining the one or more nanochannels by a chemical substitution process on the graphene-based material may involve synthesis of amide from carboxylic acid via carbodiimide. Contacting the graphene-based material with a liquid reagent and varying molarity and/or pH of the liquid reagent, on the other hand, may involve protonation or deprotonation of carboxyl or hydroxyl groups, which may take place depending on pH of the liquid reagent.

In various embodiments, the method of preparing a graphene-based membrane disclosed herein further comprises applying pressure to a surface of the stacked arrangement of layers of the graphene-based material. This may be carried out, for example, by applying a fluid such as a gas or a liquid under application of a force to the surface of the stacked arrangement of layers of the graphene-based material. Compression of the nanochannels within the graphene-based membrane may take place as a result. As the charged surfaces of the layers of the graphene-based material defining the one or more nanochannels approach each other, electrostatic repulsion force between the layers may increase, leading to increase in ionic selectivity performance of the graphene-based membrane.

From the above discussion, it may be seen that size selectivity and/or ionic selectivity of the graphene-based membrane may be controlled by varying an electrical charge on a surface of the layers of the graphene-based material defining the one or more nanochannels.

As used herein, the term "selectivity" refers to a permeation ratio between components in a feed stream. Accordingly, the term "size selectivity refers to selectivity derived from a difference in size of the components, while the term "ionic selectivity" refers to selectivity derived from a difference in electrical charge of the components, and may be expressed as a ratio of permeability of positively charged and negatively charged ions. The respective selectivity may be used as performance indicators of a membrane, for example, where species of a certain size, or only certain ionic species may pass through the membrane.

Advantageously, a graphene-based membrane according to embodiments disclosed herein have demonstrated good ionic selectivity for separation of $K^+$ and $Cl^-$ ions. In various embodiments, the graphene-based membrane disclosed herein is configured to reject ions having a radius of hydration of at least about 4.5 Å.

Various embodiments refer in a second aspect to a graphene-based membrane comprising a stacked arrangement of layers of a graphene-based material. Suitable graphene-based materials have already been mentioned above. In various embodiments, the graphene-based material comprises graphene oxide.

The graphene-based material may, for example, be in the form of a graphene sheet or a graphene-oxide sheet. Each of the layers of the graphene-based material may have a lateral dimension in the range of about 0.1 µm to about 10 µm, such as about 0.5 µm to about 10 µm, about 1 µm to about 10 µm, about 3 µm to about 10 µm, about 5 µm to about 10 µm, about 6 µm to about 10 µm, about 0.1 µm to about 8 µm, about 0.1 µm to about 6 µm, about 0.1 µm to about 4 µm, about 1 µm to about 6 µm, about 3 µm to about 9 µm, or about 4 µm to about 8 µm.

The layers of the graphene-based material define one or more nanochannels between neighboring layers. As mentioned above, the neighboring layers of the graphene-based material may be spaced apart by a distance in the range of about 0.5 nm to about 2 nm. In view that the layers of the graphene-based material define one or more nanochannels between neighboring layers, the spacing between the neighboring layers may correspond to a maximal cross-sectional width of the one or more nanochannels.

A surface of the layers of the graphene-based material defining the one or more nanochannels possess an electrical charge, wherein the layers of the graphene-based material are configured to control size selectivity and/or ionic selectivity of the graphene-based membrane by varying the electrical charge.

In various embodiments, the layers of the graphene-based material are configured to control size and/or ionic selectivity of the graphene-based membrane by varying at least one of (i) polarity of the electrical charge; (ii) magnitude of the electrical charge, or (iii) arranging layers of opposite electrical charges in the stacked arrangement. Specific methods by which the electrical charge may be varied to control size selectivity and/or ionic selectivity of the graphene-based membrane have already been discussed above.

In various embodiments, the graphene-based membrane disclosed herein is configured to reject ions having a radius of hydration of at least about 4.5 Å.

In some embodiments, the stacked arrangement of layers of a graphene-based material is arranged on a supporting substrate. Suitable materials that may be used as the supporting substrate have already been mentioned above. In specific embodiments, the supporting substrate is a further membrane, such as a membrane formed of $SiN_x$, comprising an array of nanopores.

As mentioned above, in addition to flat-sheet membranes, the graphene-based membrane may also assume different geometries, such as hollow fiber membranes, spiral wound membranes, or tubular membranes.

The graphene-based membrane disclosed herein may directly be applied as desalination membranes, nanofiltration membranes, biofiltration membranes, ion-exchange membranes, electrodialysis membranes, and filtration membranes, to name only a few, for use in a myriad of applications such as water purification, and pharmaceutical, chemical and fuel separation.

For example, the graphene-based membrane disclosed herein is able to increase ionic rejection rate without lowering water flux, thereby rendering it suitable for use in reverse osmosis water desalination applications. As further examples, the membranes disclosed herein are suitable for use in nanofiltration, as ionic and molecular selectivity of the membranes may be improved while retaining the ultra-high water flux of graphene oxide membranes. Advantageously, chemical inertness of the graphene-based membrane disclosed herein means that the membranes disclosed herein are suitable for biofiltration. The large ionic selectivity values also means that the membranes are conducive for electrodialysis application and as ion-exchange membranes.

In line with the above, various embodiments refer in a further aspect to a method of separating ions from a fluid stream. The method comprises providing a graphene-based membrane prepared by a method according to the first aspect or a graphene-based membrane according to the second aspect, and directing a fluid stream comprising one or more ions towards a first surface of the graphene-based membrane, wherein ions to be separated from the fluid stream are filtered through the graphene-based membrane. In various embodiments, directing the fluid stream comprising one or more ions towards a first surface of the graphene-based membrane is carried out without an electrical field. For example, pressure may be used as the driving force for directing fluid stream to the graphene-based membrane.

In some embodiments, directing the fluid stream comprising one or more ions towards a first surface of the graphene-based membrane is carried out with an electrical field. The method of separating ions from a fluid stream, where directing the fluid stream comprising one or more ions towards a first surface of the graphene-based membrane is carried out with an electrical field may, for example, be applied to electrodialysis.

Figure 19A:
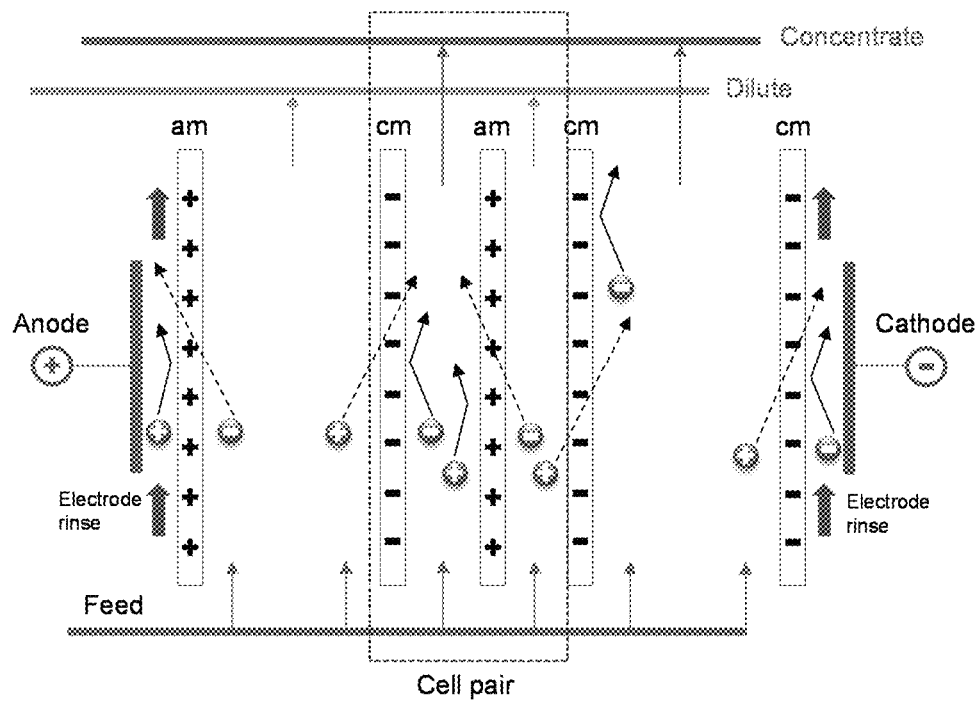
FIG. 19A is a schematic diagram of an electrodialysis process according to a first configuration. As shown in the figure, anion membranes ("am") and cation membranes ("cm") may be formed into a multi-cell arrangement built on a plate-and-frame to form a stack comprising 100 cell pairs or less. A cell pair is marked up in the figure using the dashed box. The cation membranes and anion membranes are arranged in an alternating arrangement between the anode and cathode, whereby the membrane that is positioned nearest to the anode assumes a positive charge while the membrane that is positioned nearest to the cathode assuming a negative charge. As shown in the figure, anion membranes with fixed positive groups are able to exclude positive ions, but are permeable to negatively charged ions. Likewise, cation membranes with fixed negative groups are able to exclude negatively charged ions, but are permeable to positively charged ions. By passing a liquid reagent containing ions through a space or passageway defined by an anion membrane and a cation membrane, negatively charged ions and positively charged ions may be separated from a feed stream by permeating respectively through the anion membrane and the cation membrane, to result in a dilute stream where ions have been substantially removed and a concentrate stream containing the ions.
Figure 19B:
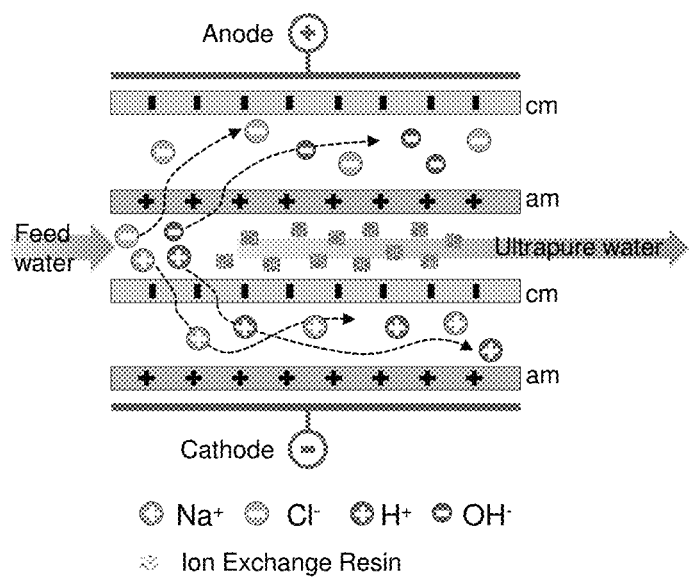
FIG. 19B is a schematic diagram of an electrodialysis process according to a second configuration. As shown in the figure, anion membranes with fixed positive groups are able to exclude positive ions, but is permeable to negatively charged ions. Likewise, cation membranes with fixed negative groups are able to exclude negatively charged ions, but is permeable to positively charged ions. By passing a liquid reagent such as water containing ions to be separated ("Feed Water") through a space or passageway defined by an anion membrane and a cation membrane, negatively charged ions and positively charged ions may be separated from Feed Water by permeating respectively through the anion membrane and the cation membrane. As a result, ultrapure water which is free or essentially free of ions may be obtained.

As used herein, the term "electrodialysis" refers to a electrochemical process involving use of at least one ion-selective or ion exchange membrane, whereby ions are transported through the at least one ion-selective or ion exchange membrane from one solution to another under driving force of an electrical potential difference such as that shown in FIG. 19A and FIG. 19B. In so doing, removal or separation of electrolytes may be achieved by electrodialysis.

With the above in mind, two or more graphene-based membranes prepared by a method according to the first aspect or a graphene-based membrane according to the second aspect may be arranged to form a cell or multi-cell arrangement such as that shown in FIG. 19A. A fluid stream comprising one or more ions may be directed towards a first surface of the graphene-based membranes by, for example, directing the fluid stream into a passageway defined by two membranes. Ions to be separated from the fluid stream may then be separated or removed from the fluid stream by filtering through the graphene-based membranes.

Advantageously, the graphene-based membrane according to embodiments disclosed may be used in or applied to electrodialysis, as they have demonstrated enhanced ionic selectivity in their abilities to selectively transport ions having positive or negative charge and reject ions of the opposite charge.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

Herein, various embodiments refer to a material for separation of ions from a fluid stream, comprising one or more graphene-based selective layers which may be intrinsically charged. The selective layers may have the same or different charges, and these charges may be positive or negative. The material may optionally be supported on a substrate to improve the overall mechanical strength of the structure. The material mentioned herein may refer to membranes or other materials that may be used for the purpose of this technology.

Various embodiments also relate to a method for separating ions from a fluid stream, comprising (i) providing materials with charged selective layers that are graphene based and with apertures dimensioned to allow flow of desired fluid molecules, and (ii) contacting fluid stream with a first surface of the charged material under suitable driving force to reject ions and allow desired fluid molecules to pass through to the second surface, wherein the driving force does not involve the use of an electrical field.

Various embodiments further refer to a method for significantly increasing and tuning the ionic rejection rate and ionic selectivity in lamellar graphene oxide membranes. The method may be applied to membranes, such as nanofiltration membranes, desalination membranes, biofiltration membranes, and ion-exchange membranes.

In greater detail, lamellar nanoporous membranes made from graphene oxide (GO) nanosheets have an ultra-high water flux (1000 better than current membranes), and show a sharp size cutoff at about 4.5 Å in ionic permeability as a function of hydrated radii of the permeant ions or organic molecules. Ionic rejection may be driven by geometric size exclusion, and size of nanochannels in GO membranes may be decreased to achieve a much smaller cutoff size required for desalination.

As identified herein, there is presence of an important additional mechanism that defines ionic permeability in GO membranes: charge surface groups inside the GO nanochannels are responsible for electrostatically repulsing co-ions. For example, it was found by the inventors that negatively charged GO membranes have 10 times smaller permeability for negatively charged $Cl^-$ ions and for positively charge $K^+$ ions, although they have the same hydration radius. The same trend is observed for many other ionic species, as discussed below.

By chemically engineering the charged surface groups within GO-derived laminates of the membrane, ionic selectivity and size cutoff of GO-derived membranes may be increased. This may involve one or more of (a) converting negatively charged surface group to positively charged surface groups; (b) increasing magnitude of the surface charge; and (c) interlaying positively and negatively charge GO-derived laminates within the membrane.

By converting negatively charged surface groups to positively charged surface groups, cation rejection rate over anion may be increased.

By increasing magnitude of the surface charge, anion/cation selectivity and selectivity based on ionic valence may be increased. Ion rejections may be increased, while retaining size-selected permeation of neutral molecular species.

By interlaying positively and negatively charge GO-derived laminates within the membrane, size-cutoff for both anions and cations may be increased significantly without lowering water permeability that may otherwise result from changing size of nanochannels within the membrane. The tandem structures of negatively and positively charged graphene oxide sheets allow electrostatic water desalination to take place.

Surface charge-driven ion sieving properties of membranes disclosed herein may result from charged graphene oxide capillaries, which leads to high rejection levels of like-charge ions in the capillary. Advantageously, the increase in ion rejection via surface charge modulation may be effected without affecting the excellent water permeation properties of the GO-derived membranes. Further, the charges on the membrane surface is tunable by varying molarities or pH of electrolytes. Chemical substitution or reduction processes may be carried out to control the charges. These translate into tunable, surface charge-governed ion permselectivity characteristics of the membranes disclosed herein.

The membranes disclosed herein may directly be applied as desalination membranes, nanofiltration membranes, biofiltration membranes, ion-exchange membranes, electrodialysis membranes, and filtration membranes, for use in a myriad of applications such as water purification, and pharmaceutical, chemical and fuel separation.

For example, although state of the art GO membranes may have ultra-high water flux, their ionic rejection rate is insufficient for reverse osmosis water desalination applications. The engineered GO membranes disclosed herein is able to increase ionic rejection rate without lowering water flux, thereby rendering it suitable for use in reverse osmosis water desalination applications.

As further examples, the membranes disclosed herein are suitable for use in nanofiltration, as ionic and molecular selectivity of the membranes are improved while retaining the ultra-high water flux of GO membranes. Advantageously, chemical inertness of GO membranes means that the membranes disclosed herein are suitable for biofiltration.

The large ionic selectivity values also means that the membranes are conducive for electrodialysis application and as ion-exchange membranes.

Example 1: Microscopic Graphene Oxide Membranes and Demonstration of its Ionic Charge Selectivity

Example 1-A: Fabrication of Freestanding SiNx Membrane and Nanopore Arrays

As a supporting substrate for graphene oxide (GO) membranes, a 3×3 mm² Si/SiN$_x$ chip with free-standing SiN$_x$ membrane perforated with an array of nanopores was used.

The support chip was fabricated from a standard 4-inch silicon wafer, coated from both sides with a 300 nm thick low-stress SiN$_x$ layer deposited at Cornell NanoScale Science and Technology Facility, using low pressure chemical vapor deposition. Photolithography and reactive ion etching were used to define windows in the SiN$_x$ coating on one side of the support chip.

Using standard isotropic wet chemical etching with potassium hydroxide (KOH), through the windows, 150×150 μm² sized freestanding membranes of SiN$_x$ having a thickness of 300 nm were fabricated.

The processed silicon wafer was subsequently diced into 3×3 mm² chips, with a freestanding membrane in the center of each chip. In the center of the freestanding membrane, direct milling using Ga-source focused ion beam (FIB) microscopy (AURIGA 60, Carl ZEISS Microscopy, GmBH; Helios NanoLab DualBeam, FEI Company) was used to fabricate a 12×12 array of square-shaped nanopores with dimensions 200×200 nm² spaced 200 nm apart.

Example 1-B: Fabrication of Graphene Oxide Membranes

Graphite oxide was prepared by the modified Hummers method, and exfoliated into monolayer sheets by sonication in deionized water, following by centrifugation at 5,000 g to remove remaining multilayer crystals. GO membranes were prepared by the vacuum filtration of the GO suspension through Anodisc Alumina (AAO) membranes with a pore size of 0.02 and had thicknesses of between 10 nm to 10 μm depending on the concentration of GO suspension.

The GO membrane was dried overnight at ambient conditions. Separation of the GO membranes from AAO filters was achieved by immersing in water, whereby the GO membranes spontaneously floated on the water surface when immersed in water while the AAO filters sank down the bottom.

The freestanding GO membranes floating on water surface was scooped onto the silicon chip with a small area of suspended SiN$_x$. The chip-mounted GO membranes were fully dried overnight at ambient conditions.

Example 1-C: Fluidic Cell Preparation

The chip-mounted GO membranes were assembled between two half-cells of a custom-built microfluidic cassette made of polyether-ether-ketone. The two sides of the chips were sealed with polydimethylsiloxane (PDMS) gaskets, with openings to the supported GO membrane from each side. The chambers of each half-cell were filled with an electrolyte of choice and put into contact with Ag/AgCl electrodes.

Example 1-D: Ion Transport Measurements

The Ag/AgCl electrodes in each half-cell were used to apply an electric potential across the graphene oxide membranes and to measure ionic currents. The current were acquired using an Axopatch 200B (Axon Instruments) amplifier, which was connected to a low-noise data acquisition system, Digidata 1440A (Axon Instruments). The ionic conductance of the membrane was calculated from the slope of the I-V curve at low voltage (−10 mV to +10 mV).

Example 1-E: Characterizations of Graphene Oxide Membranes

Physiochemical properties of the graphene oxide nanosheets were investigated using AFM, atomic force microscopy (Cypher, Oxford Instruments and Dimension_Fastscan, Bruker) and FTIR, Fourier transform infrared spectroscopy (Vertex 80v, Bruker). In addition, X-ray powder diffraction (X'Pert, Philips) data were collected with λCuKα radiation using a conventional diffractometer. The experimental conditions were: Bragg Brentano geometry, fixed divergence and receiving slits, step scan mode in the range of 5°≤2θ≤45° with 2θ=0.02° and t=3 s counting time.

Example 1-F: Experimental Results on Ionic Selective Transport

Figure 2A:
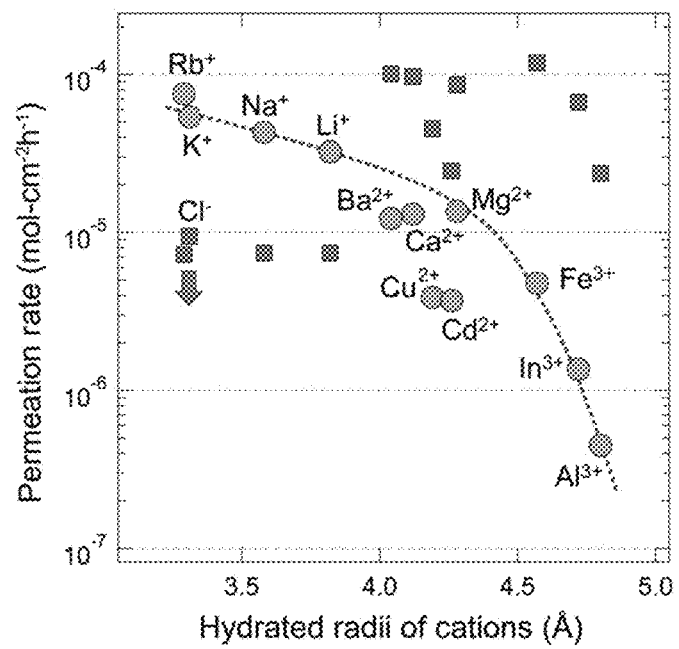
FIG. 2A is a graph of permeation rates of various cations and pairing counter anion across the membranes, plotted as a function of hydration size of cations, demonstrating ultrahigh charge-selective permeability of the graphene oxide membranes.

To elucidate the ionic selectivity of the GO membranes, the permeability of a wide selection of aqueous salt ions, with varying ionic charges and spanning a wide range of effective hydrated ionic volume were investigated (FIG. 2A).

From the evaluated permeation rates, two general trends were revealed: (a) cation permeability decreased exponentially with increased hydration radius, followed by the sharp cutoff at $R_H \approx 4.6$ Å; and (b) permeability of the negatively charged Cl⁻ ion was suppressed by an order of magnitude compared to the positive K⁺ and Rb⁺ ions, despite all those ions having very similar hydration volumes.

Figure 2B:
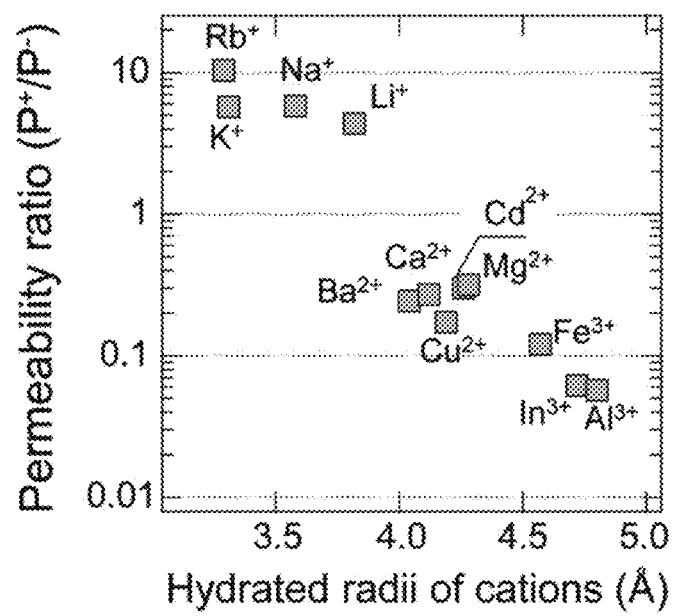
FIG. 2B is a graph of relative cation-to-anion permeability ratio calculated from the measured membrane potentials, demonstrating ultrahigh charge-selective permeability of the graphene oxide membranes.
Figure 2C:
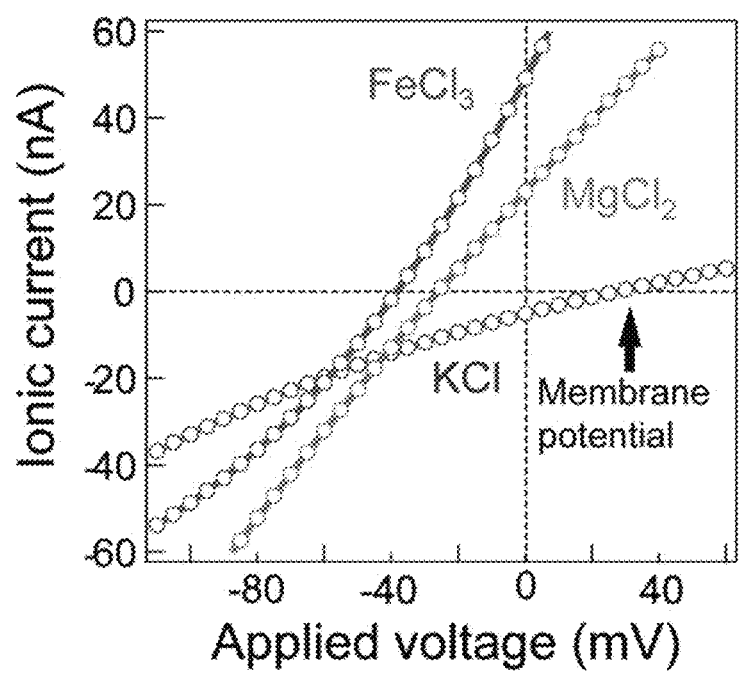
FIG. 2C is a graph of current-voltage curves obtained from the zero current potential (or membrane potential) measurements, carried out under asymmetric electrolyte concentrations ($C_{high}/C_{low}$=10) at around pH 5.5 across the membranes, demonstrating ultrahigh charge-selective permeability of the graphene oxide membranes.
Figure 3:
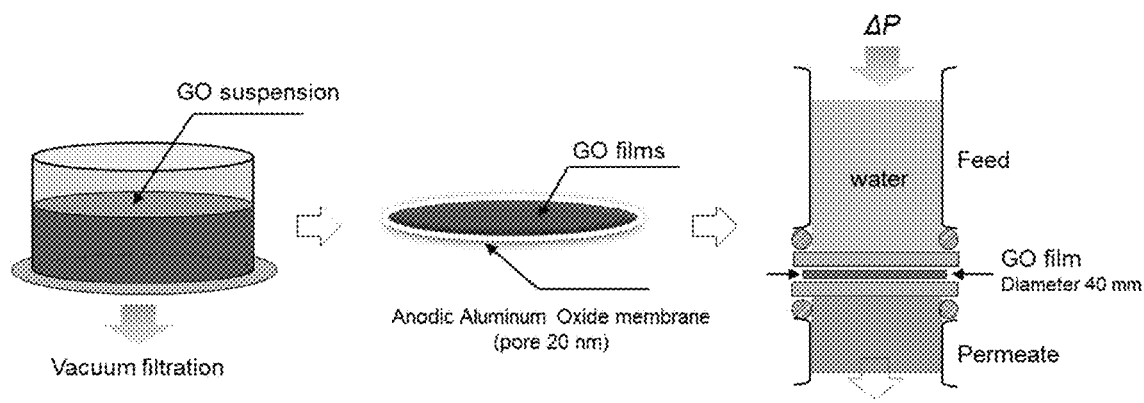
FIG. 3 is a schematic diagram showing experimental procedure for water flux measurement across the membranes.

For example, potassium chloride exhibited the highly selective, cation-to-anion permeability ratio (P⁺/P⁻) of up to max 10 as shown in FIG. 2B. This selectivity was a result from the expulsion of the negatively charged Cl⁻ ions from nanochannels, and suppression of the anionic permeability, as predicted by the electric double layer model. Permeability of Cl⁻ ions in monovalent salts remained independent of counterions (Rb⁺, K⁺, Na⁺, Li⁺); and the cation selectivity, P⁺/(P⁺+P⁻) reached values in excess of 90%.

Example 2: Water Permeance Across Scaled-Up Graphene Oxide Membranes

Example 2-A: Fabrication of Scaled-Up Graphene Oxide Membranes and Water Permeance Measurements The graphite oxides were exfoliated into monolayer sheets by sonication in deionized water, following by centrifugation at 5,000 g to remove remaining multilayer crystals. GO membranes were prepared by the vacuum filtration of the GO suspension through Anodisc Alumina (AAO) membranes with a pore size of 0.02 μm and had thicknesses of between 0.3 to 3 depending on the concentration of GO suspension.

Water flux evaluation was performed on a dead end filtration device (HP4750 Stirred Cell, Sterlitech Corp.) The transmembrane pressure is driven by nitrogen gas in the range of 1 to 7 bars. The effective area (A) of water permeation in the cell is 8.295 cm². The membranes sealed by rubber O-ring were fixed at the bottom of the water cell. The water flux (J) was measured by collecting permeated water (V) across the membranes under certain pressure and calculated using the equation J=V/A·t·ΔP where t is the operation duration. The water flux was recorded when it is stabilized at 1 to 2 bar and neutral pH.

Example 2-B: Experimental Results on Water Permeance

Figure 4A:
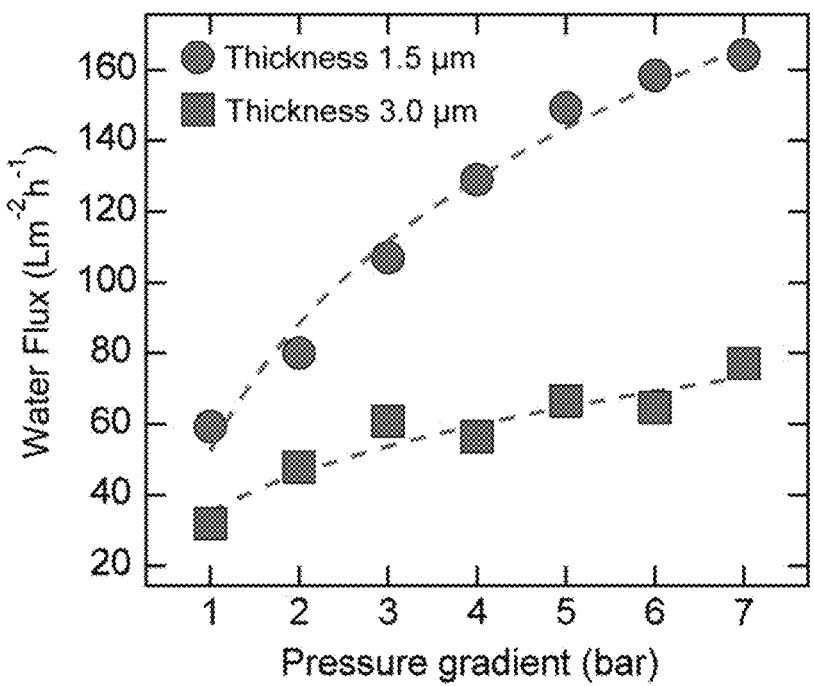
FIG. 4A is a graph depicting water flux versus applied pressure of a GO membrane disclosed herein.
Figure 4B:
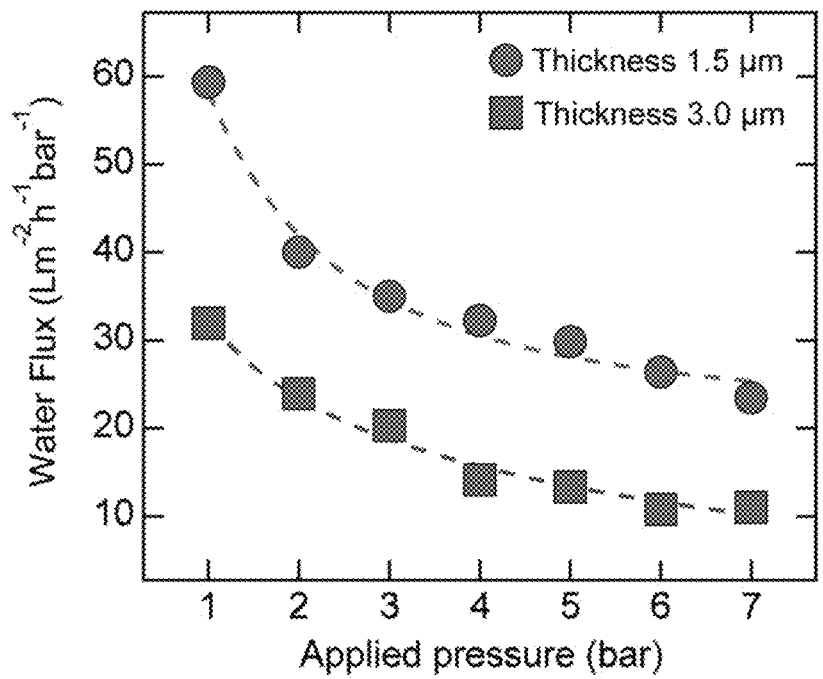
FIG. 4B is a graph depicting water flux versus applied pressure of a GO membrane disclosed herein.
Figure 4C:
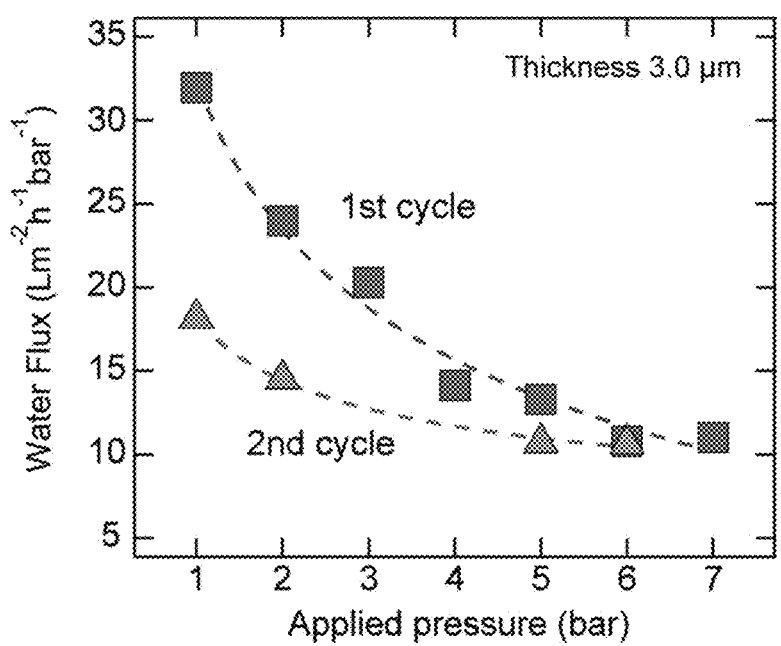
FIG. 4C is a graph depicting iteration testing of water flux performance.
Figure 4D:
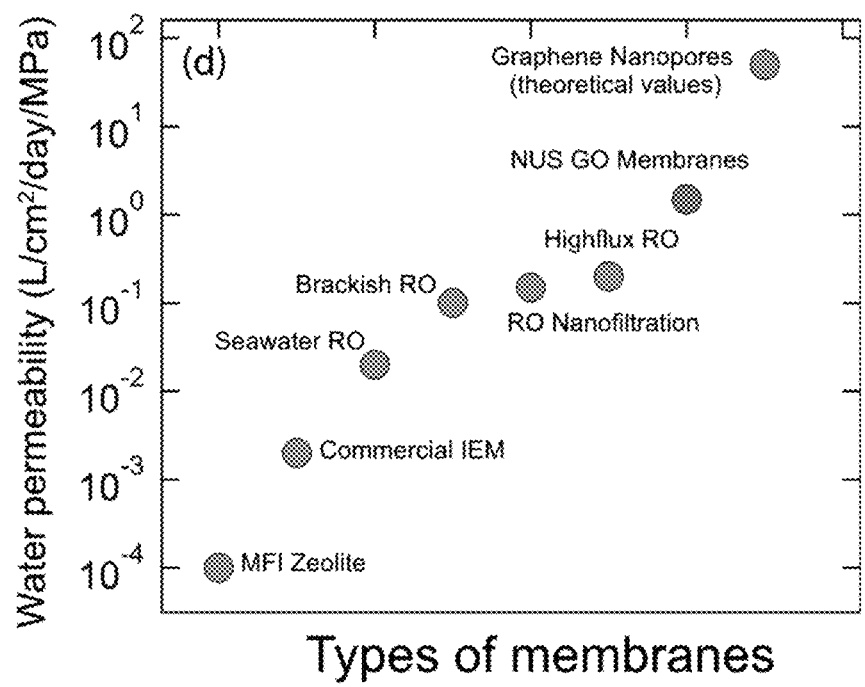
FIG. 4D is a graph showing comparison of the water flux of the GO based membranes disclosed herein to the water flux of other types of membranes.

As shown in FIG. 4A, water flux at the first pressure loading increased quickly in low-pressure range, and the increment slowed down under high pressure regime. At high pressure, corrugated ripple in the GO membranes began to collapse, leading to the compression of the interlayer channels with the increasing pressure. As negatively charged GO sheets approached each other much closer, the electrostatic repulsion force between nanosheets increased sharply, leading to the increment of ionic selectivity performances of the GO membranes. When the pressure increased from 1 bar to 7 bar, the unit water flux at each pressure became obviously slower as shown in FIG. 4B. Furthermore, the second pressure loading was carried out after releasing the applied pressure in order to ensure sufficient mechanical durability at the pressure where the membranes would be used (FIG. 4C). No mechanical crack or delamination were observed even after iteration.

Figure 5:
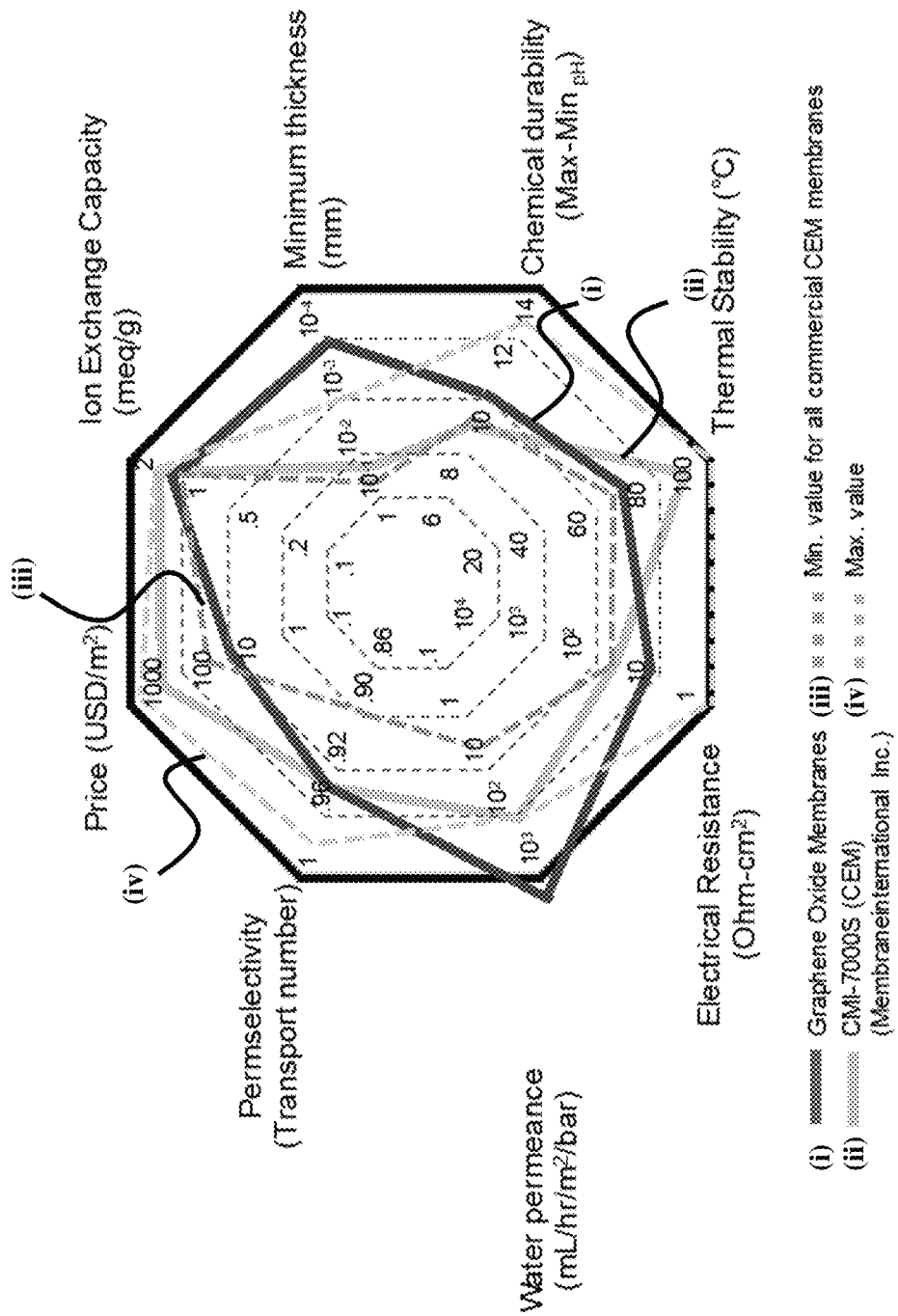
FIG. 5 is a schematic diagram providing a comparison of performances: commercial cation exchange membranes (CEM) vs graphene oxide membranes. Larger is better, except for the price. (i) represents graphene oxide membranes according to embodiments disclosed herein, while (ii) represents the best commercial CEM membrane, dashed lines represent (iii) minimum and (iv) maximum values found in commercial membranes.

Example 3: Commercial Feasibility of Graphene Oxide Stacks as Ion Exchange Membranes FIG. 5 illustrates that graphene oxide membranes possess commercially feasible performances compared to those from commercial polymeric ion exchange membranes. In particular, the GO membrane can realize ultrahigh water flux exceeding that of polymeric membranes at much thinner thickness by two order of magnitude while sustaining high ionic permselectivity.

Example 4: Drift-Diffusion Technique

Using microscopic drift-diffusion experiments over a wide range of ions of different size and charge, the inventors were able to clearly disentangle different physical mechanism contributing to the ionic sieving in GO membranes—electrostatic repulsion between ions and charged chemical groups; and the compression of the ionic hydration shell within the membrane's nanochannels, following the activated behavior.

The charge-selectivity allowed for design of membranes with increased ionic rejection, and opened up the field of ion exchange and electrodialysis to the GO membranes.

The GO membranes consisted of stacked layers of impermeable graphene sheets, where L=1 to 10 μm in size, spaced by d=0.9 to 1.2 nm via functionalized, mostly oxygen-carrying groups. The chemical groups were coalesced into nanoscale domains, delimiting a percolative network of pristine graphene channels, which could accommodate a few layers of water exhibiting frictionless flow.

Previous experiments measuring salt diffusion through centimeter-scale membranes over a period of hours, showed no permeation for ions with hydration rates above size cut-off of $R_H \approx 4.5$ Å and mostly unvarying permeation rate for smaller ions. The experiments, due to their nature, were (i) ineffective in disentangling all the physical mechanisms contributing to the permeability, (ii) unable to distinguish permeability of different constituting ions in the salt, and (iii) may be prone to artifacts due to external defects and tears over larger areas of the membrane.

To understand intrinsic membrane properties, the inventors implemented a highly sensitive drift-diffusion technique, which revealed ultra-high charge-selectivity of the GO membranes.

Figure 6A:
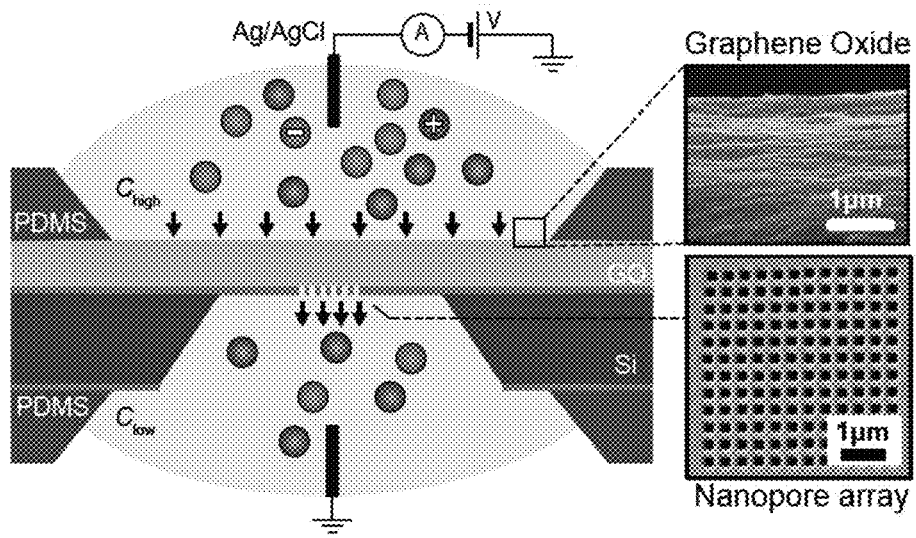
FIG. 6A is a schematic diagram showing preparation of chip-mounted graphene oxide membranes for drift-diffusion experiment according to an embodiment. The graphene oxide membrane was mounted on a freestanding $SiN_x$ membrane with a 12×12 array of square-shaped windows, separating two electrolyte-filled reservoirs; Ag/AgCl electrodes in each reservoir were used to apply an electric potential across the GO membrane and to measure the ionic currents flowing through the membrane.

The ionic permeability of a 3 μm thick GO membrane, mounted across an array of 200×200 nm² apertures in a 300 nm thick, free-standing, insulating $SiN_x$ layer on a Si substrate chip was measured (FIG. 6A). By limiting the exposed membrane area to about 5 μm² and keeping it relatively thick, the inventors ensured there were no unintended cracks and defects that may skew the results. The GO membrane and its constituting GO crystallites were extensively characterized using characterization tools such as atomic force microscopy, X-ray diffraction, and Fourier transform infrared spectroscopy (See Example 5).

The membrane chip was inserted in a fluidic cell, so that it separated two compartments, each subsequently filled with ionic solutions electrically contacted with Ag/AgCl electrodes. The electrodes were connected to a sensitive patch-clamp amplifier (Axopatch 200B), sourcing voltage across the membrane and measuring ionic currents with 10 pA precision. The polydimethylsiloxane (PDMS) gasket seal precluded ionic solution from leaking around the edges of the membrane.

Figure 6B:
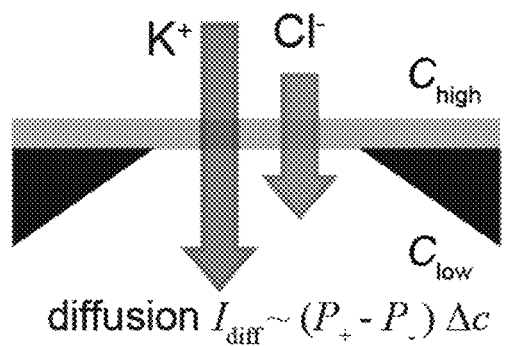
FIG. 6B is a schematic diagram depicting ionic flow across the membrane, driven by concentration gradient (diffusion) according to an embodiment.

To discern the separate permeabilities of cations ($P^+$) and anions ($P^-$) in the salt, the inventors implemented the drift-diffusion technique to measure ionic currents driven by both the voltage and the concentration gradient. The fluidic compartments were filled with different concentrations of a salt, and the inventors were able to measure diffusive current across the membrane for zero applied voltage using the equation $I_{diff} \sim (P_+ - P_-) \cdot \Delta c$ (FIG. 6B).

Figure 6C:
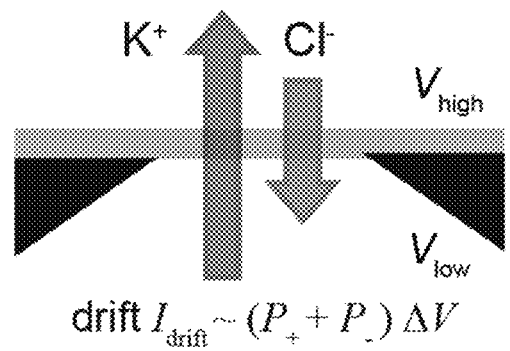
FIG. 6C is a schematic diagram depicting ionic flow across the membrane, driven by voltage difference (drift) according to an embodiment.

As the inventors applied a voltage difference $\Delta V$ across the membrane, the added electrophoretic component to the overall current was $I_{drift} \sim (P_+ + P_-) \cdot \Delta V$ (FIG. 6C). Measuring the two current components, both $P_+$ and $P_-$ permeabilities may be deduced.

Figure 6D:
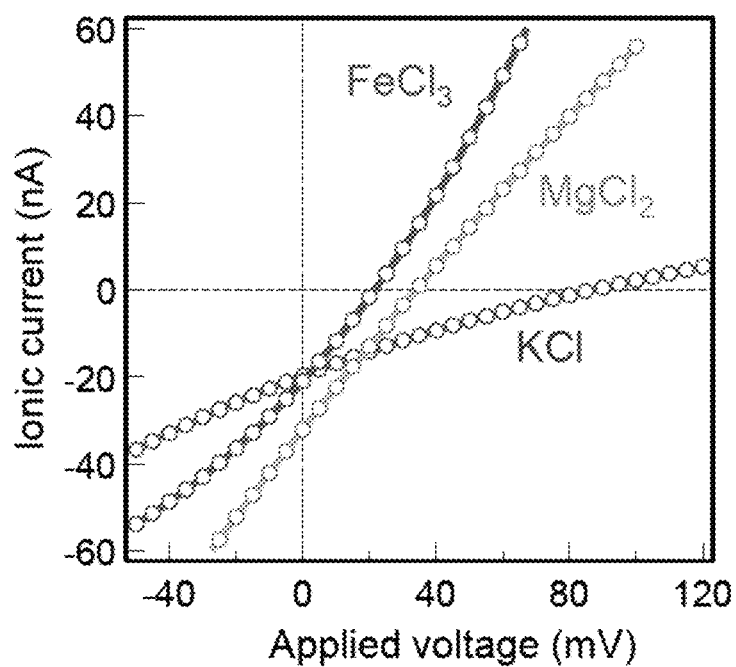
FIG. 6D is a graph showing ionic current-voltage characteristic of the membrane for different salts, measured under the concentration gradient 0.1M/0.01M across the membrane.

FIG. 6D shows representative current-voltage (I-V) curves, measured at a fixed concentration gradient: the slope of the curve was indicative of $I_{drift}$; whereas membrane potential $V_m = V (I=0)$ is indicative of $I_{diff}$. More precisely, the inventors extracted the individual permeabilities by modeling the total current density J(Δc, ΔV) across the membrane using the equation:

$$J = \sum_S P_S z_S^2 \cdot \frac{F^2 \Delta V}{RT} \cdot \frac{[S]_f - [S]_p \exp\left(\frac{z_S F \cdot \Delta V}{RT}\right)}{1 - \exp\left(\frac{z_S F \cdot \Delta V}{RT}\right)}$$

For each ionic species S in the solution, $P_S$ is membrane permeability, $z_S$ is the valence, and $[S]_f$ and $[S]_p$ are the ionic concentrations in the feed and permeate chambers, respectively. Potential across the membrane $\Delta V$ was adjusted for the electrodes' redox potential; R is the universal gas constant; F is Faraday's constant; and T is the temperature. Details on the model and the method are detailed in a subsequent example.

To elucidate the ionic selectivity of the GO membranes, the inventors investigated the permeability of a wide selection of aqueous salt ions, with varying ionic charges and spanning a wide range of effective hydrated ionic volumes.

Figure 7A:
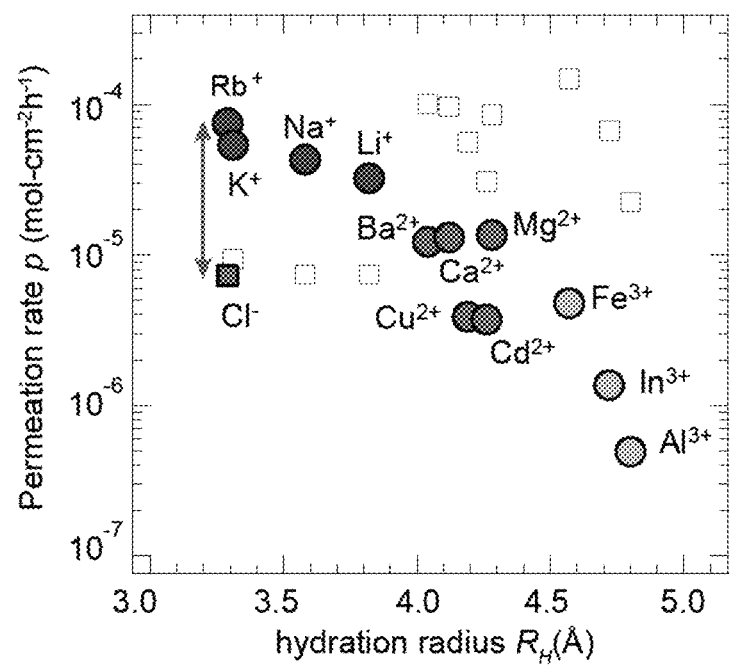
FIG. 7A is a graph showing permeation rates (p) for different cations (circles) and corresponding chloride counter-ions (open and filled squares) as a function of hydrated radius ($R_H$) of the cations are shown. The filled square represents the chloride permeability when in RbCl solution, where the hydration radii are very similar for both ions—the two-headed arrow shows the permeation difference resulting purely from the charge rejection effects.
Figure 7B:
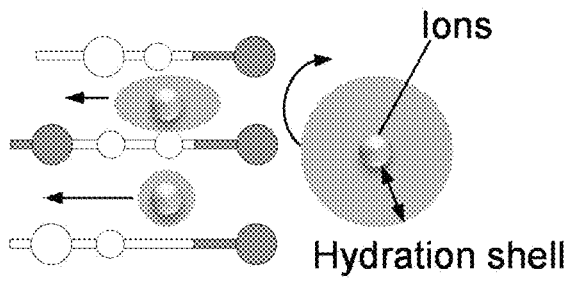
FIG. 7B is a schematic diagram depicting the dominant ion rejection mechanism of size exclusion.
Figure 7C:
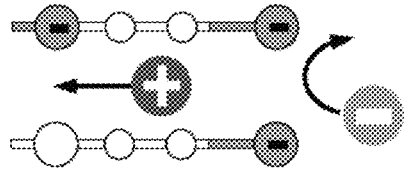
FIG. 7C is a schematic diagram depicting the dominant ion rejection mechanism of electrostatic repulsion.

FIG. 7A depicts the permeation rates (p) of different cations (circle) and their corresponding $Cl^-$ counter ions (squares) as a function of the cation's hydration radii. Two general trends were revealed: (a) cation permeability decreased exponentially with increased hydration radius, followed by the sharp cutoff at $R_H \approx 4.6$ Å; and (b) permeability of the negatively charged $Cl^-$ ion was suppressed by an order of magnitude compared to the positive $K^+$ and $Rb^+$ ions, despite all those ions having very similar hydration volumes. The inventors concluded that the two dominant mechanisms for the ion rejection in GO membranes were size exclusion due to compression of the ionic hydration shell in narrow channels, and electrostatic repulsion due to membrane surface charge (FIG. 7B and FIG. 7C).

The results from earlier diffusion experiments were limited to measuring the permeability of the least permeable species in a salt—for monovalent salts they were actually measuring permeability of the chlorine counter-ion, not cations. This led to apparent size-independent permeability for ions with hydration radii below the cut-off size defined by the channel height (implying rigid hydration shells around ions).

Instead, by properly separating cations and anions, the inventors observed the exponential dependence of the permeability on an ion's hydration radius, consistent with the compressible hydration shell model, where coordinated water molecules could rearrange themselves to squeeze the hydration shell through a narrow channel.

Figure 7D:
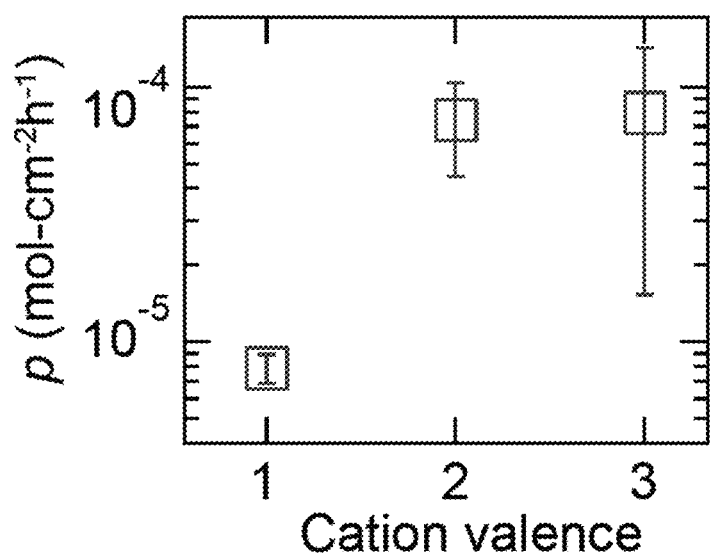
FIG. 7D is a graph showing permeation rates of chloride ions as a function of the valence of the position counter-ion in the salt, revealing the effect of the correlated charge inversion in the sub-nanometer channels.
Figure 8:
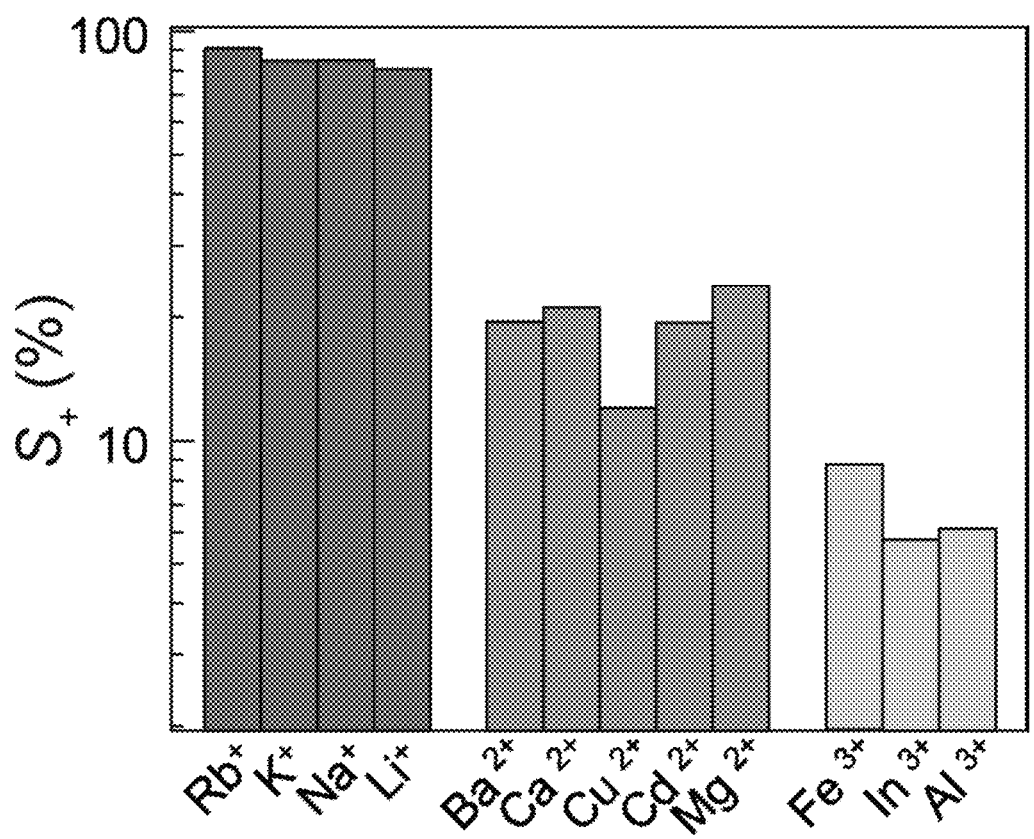
FIG. 8 is a graph showing cationic selectivity. The cationic selectivity of GO membranes for different salts, reaching values in excess of 90%.

The inventors postulated that the high charge selectivity of the GO membranes was a result of the negatively charged nanochannels in a GO membrane, due to the protonable oxygen groups. This led to the expulsion of the negatively charged $Cl^-$ ions from nanochannels, and suppression of the anionic permeability, as predicted by the electric double layer (EDL) model. Permeability of $Cl^-$ ions in monovalent salts remained independent of counterions ($Rb^+$, $K^+$, $Na^+$, $Li^+$); and the cation selectivity $S_+ = P_+/(P_+ + P_-)$; reached values in excess of 95% (FIG. 8). Interestingly, the EDL model does not appear to work in the case of chloride salts with divalent and trivalent cations, and $P(Cl^-)$ reverts to the value predicted for uncharged channels (FIG. 7A and FIG. 7D). The inventors attributed this effect to correlation-induced charge inversion, where multivalent ions overcompensate monovalent surface groups, leading to a sharp drop in, or even an inversion, of the effective surface charge, which were similarly observed in highly charged protein channels, such as bacterial porin OmpF, and in narrow silica channels.

Figure 9A:
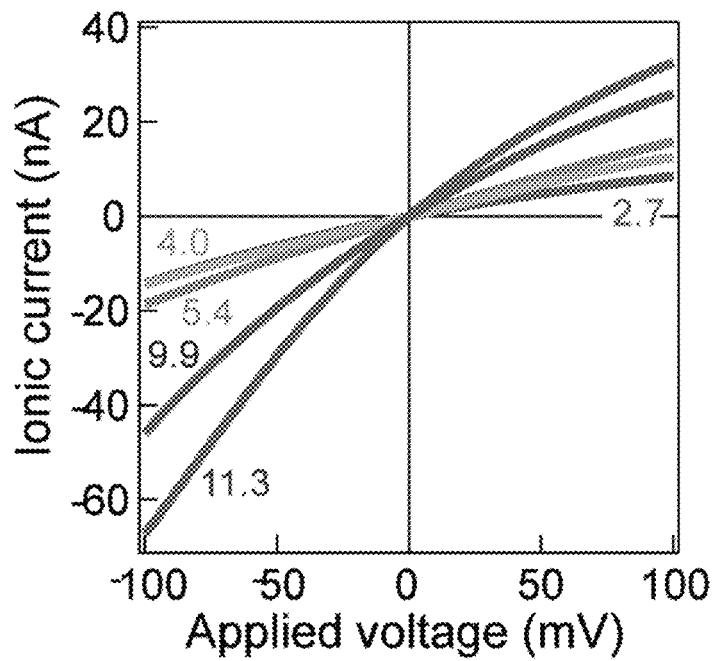
FIG. 9A is a graph showing current-voltage (I-V) curves across the membranes at KCl salt concentration $c_{KCl}$=10 mM, measured for different pH values.
Figure 9B:
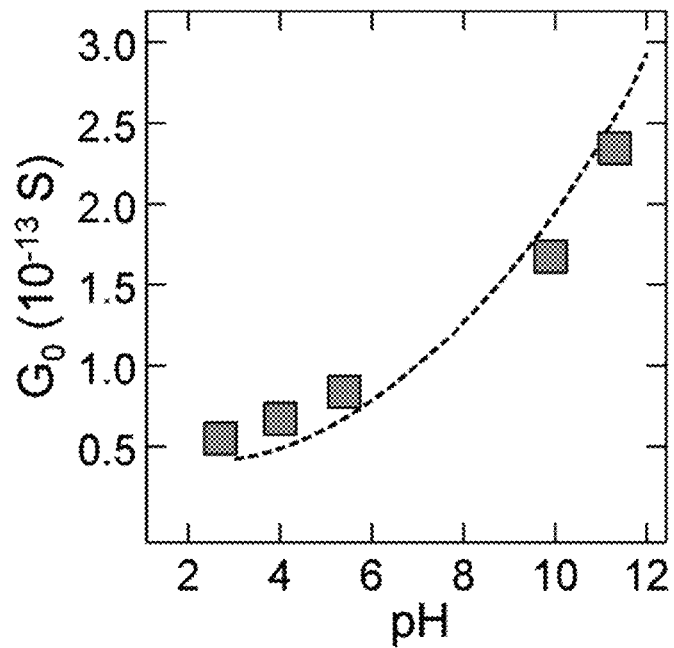
FIG. 9B is a graph showing conductance vs pH. Dashed curve in the graph was fitted to the mean-field model.

To further investigate the ionic selectivity of GO membranes, the inventors performed a series of drift-diffusion and ionic conductivity measurements using KCl aqueous solutions for a range of pH and molarity values. FIG. 9A shows current-voltage (I-V) curves for an isotropic KCl concentration CKCZ=10 mM, measured for different pH values (see also FIG. 12A). The ionic conductance of the membrane was calculated from the slopes of the I-V curves in the Ohmic regime at low voltage. The increase in pH (reduction in hydronium concentration) led to increased dissociation of the carboxyl and hydroxyl groups within the GO sheets:

Figure 9C:
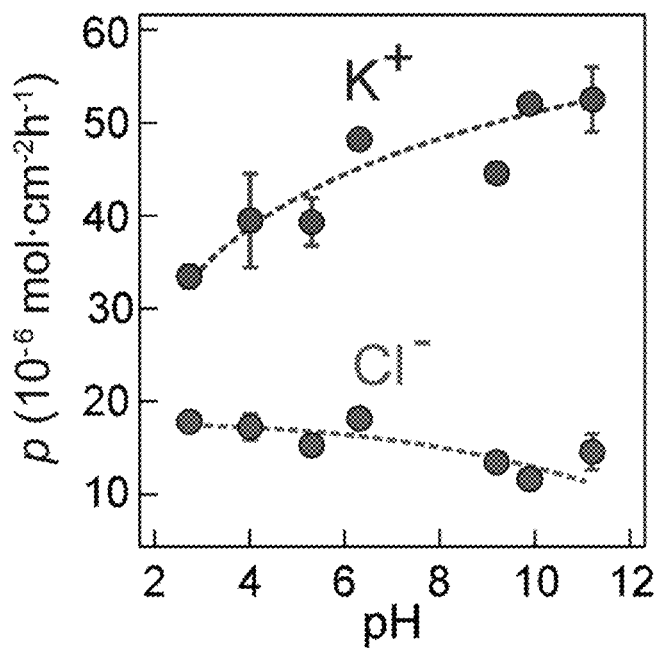
FIG. 9C is a graph showing permeation rates for potassium ($K^+$) and chloride ($Cl^-$) ions for different pH values. Dashed curves in the graph were fitted to the mean-field model.

This led to an increase in negative surface charge density in the graphene nanochannels, and was reflected in an increased conductance and current rectification. At higher pH, the inventors also observed an increase in $P(K^+)$, a decrease in $P(Cl^-)$ and an increase in cation selectivity $S_+$ (FIG. 9C), all consistent with the increase in the nanochannels' charge.

Figure 9D:
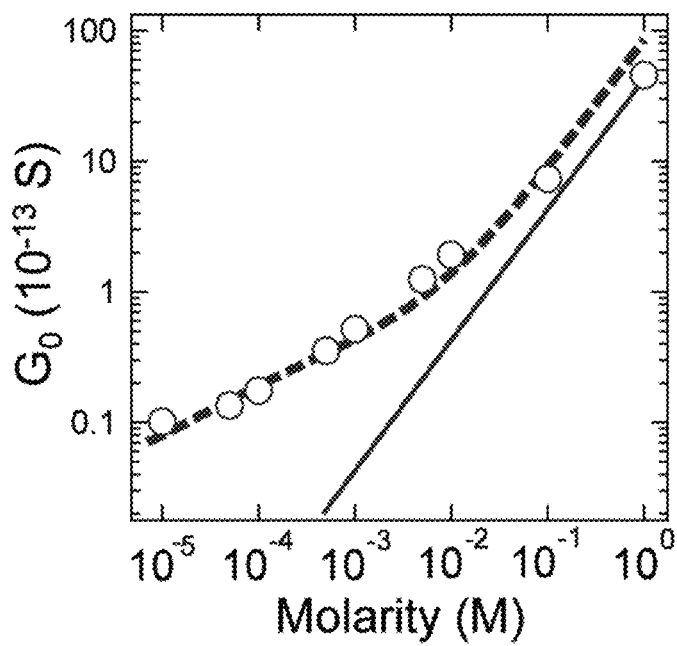
FIG. 9D is a graph showing ionic conductance vs molarity (circles) deviating from the Ohmic behavior (full line), even at high salt concentrations, due to sub-nanometer channel heights. Dashed curve in the graph was fitted to the mean-field model.
Figure 9E:
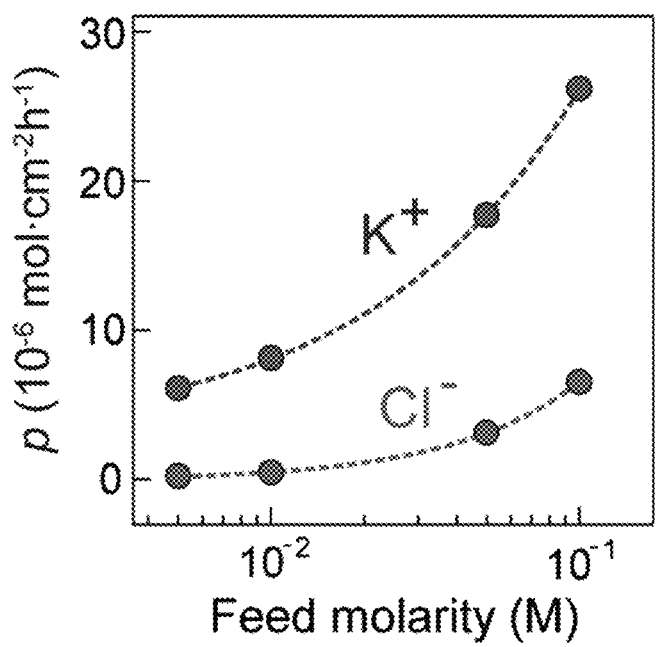
FIG. 9E is a graph showing molarity dependence for permeation rates for potassium ($K^+$) and chloride ($Cl^-$) ions. Dashed curves in the graph were fitted to the mean-field model.
Figure 9F:
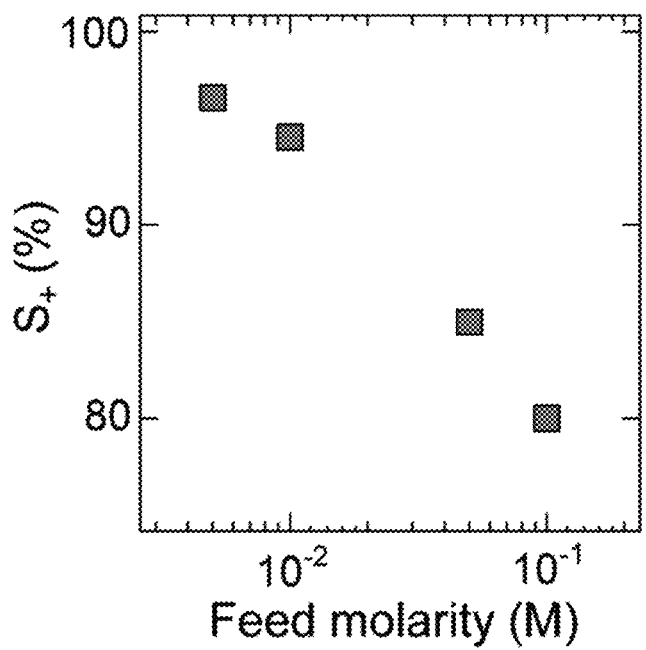
FIG. 9F is a graph showing molarity dependence for cation selectivity.

The strong surface charge effects were revealed in the membrane's conductance $G_0$ variation with the electrolyte concentration c (FIG. 9D). Starting from c=1 M, the observed $G_0$ immediately deviates from the expected linear regime for a charge-neutral membrane (black solid line), indicating the compression of the EDL in the nanochannels even at high ionic strengths. In contrast, the charge effects were previously observed to dominate the conductance in solid-state constrictions only at much lower salt concentrations. The inventors noted that the cation selectivity, as deduced from ionic permeabilities (FIG. 9E), could reach as high a value as $S_+$=96% at low salt concentration (FIG. 9F).

Figure 15:
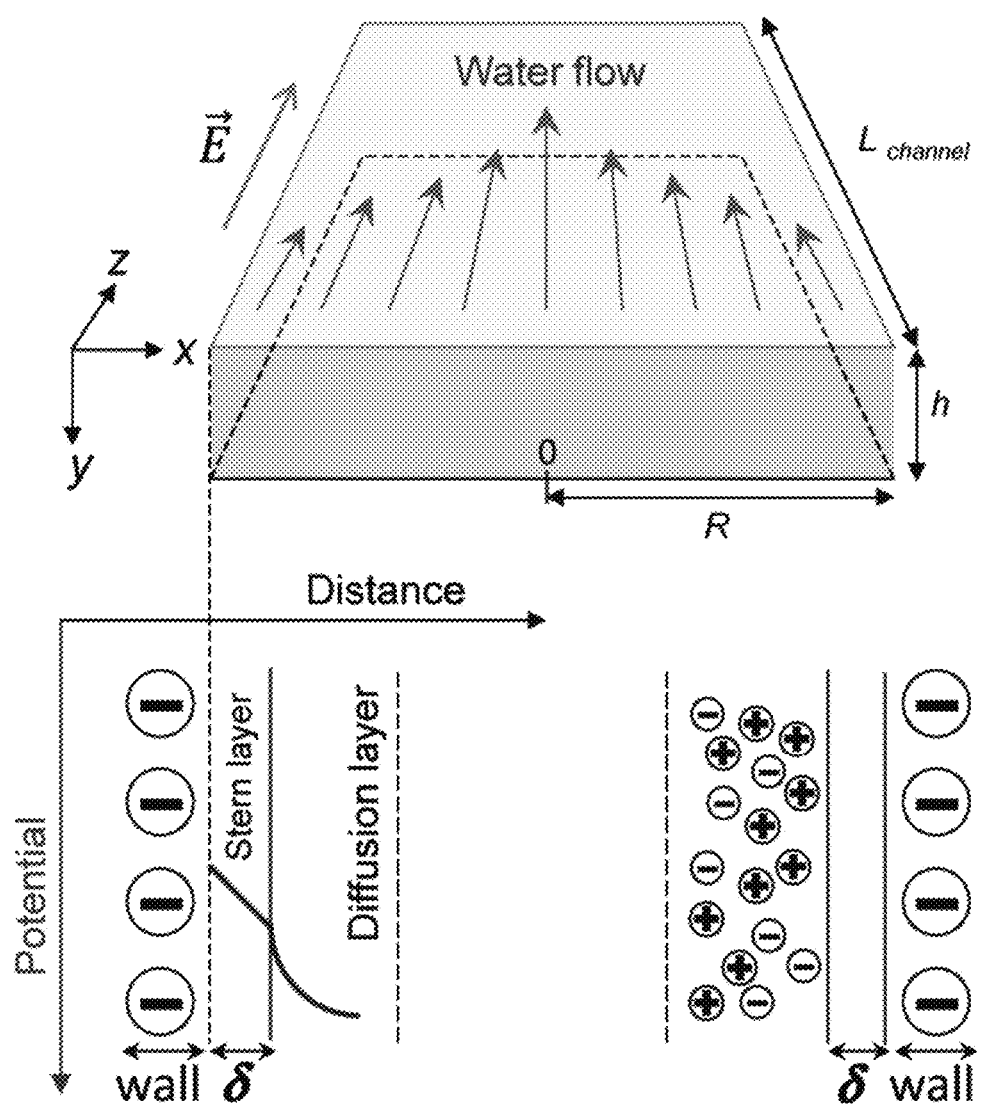
FIG. 15 is a schematic diagram showing a graphene oxide nanochannel presumed as a rectangular channel with dimensions of effective height, h, channel length, Lchannel, and channel width, 2R.

To gain insight into the surface charge-driven ionic transport, the inventors applied mean-field theoretical model based on the Poisson-Boltzmann, Navier-Stokes and Behriens-Grier equations (see Example 11 below for more details). The model fit the observed pH and molarity dependence of both the conductivity and the charge selectivity well (FIG. 9A to FIG. 9F), assuming the ions flow in pristine graphene nanochannels with an effective height of $h_G$=0.9 nm, an effective width in the range of $w_G \sim 50$ nm, and a linear charge density on the sidewalls corresponding to one protonable charged site per 2 nm (FIG. 15). A crucial assumption of the model was the infinite-slip boundary condition for the water flow at the top and bottom graphene surfaces, and no-slip condition at the oxidized sidewalls. The large slip-length was consistent with the effect of frictionless water flow, as reported in GO membranes. The other possible geometries could not replicate the observed pH and molarity dependence of the conductance (see Example 12 below).

The inventors employed the same set of parameters to concurrently simulate all the independent experiments. Although this continuous-media model may demonstrate a limited scope at nanometer length scales, it was shown to capture the relevant physics and to give sufficient semi-quantitative insight, while intermolecular and steric interactions were renormalized into the effective hydrodynamic dimensions.

In conclusion, the inventors have shown that the ion-rejection in graphene-oxide membranes was driven as much by the electrostatic repulsion (defined by the nanochannel surface charge) as it was by the activated size-exclusion (defined by the nanochannel height). Hence, the engineering of the surface charge of the membrane offered a new venue for increasing the overall salt rejection, without constraining the water flux.

The inventors have demonstrated that the GO membranes exhibit ultra-high charge selectivity, reaching up to 96%, driven by the negative surface charge of the oxygen-carrying functional groups in the membrane's nanochannels. Coupled with their high durability and scalability, the GO membranes were well positioned for applications in high-performance ion exchange and electrodialysis technologies.

Example 5: Physiochemical Characterizations of Graphene Oxide Nanosheets

As mentioned above, the GO membrane and its constituting GO crystallites were extensively characterized using characterization tools such as atomic force microscopy, X-ray diffraction, and Fourier transform infrared spectroscopy.

Figure 10A:
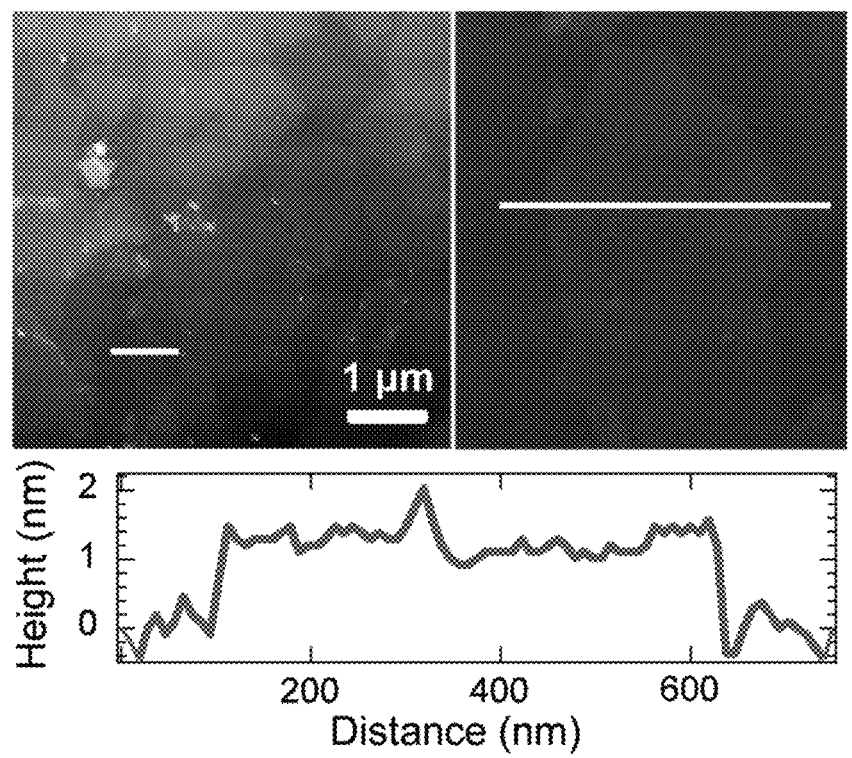
FIG. 10A is an atomic force microscopy (AFM) map and height profile for monolayer GO nanosheet. (Dimension Fastscan, Bruker) Two-dimensional GO nanosheets at ambient conditions were about 1 nm thick with mean planar width of 1 μm.

FIG. 10A is an atomic force microscopy (AFM) map and height profile for monolayer GO nanosheet. (Dimension Fastscan, Bruker) Two-dimensional GO nanosheets at ambient conditions were about 1 nm thick with mean planar width of 1 μm.

Figure 10B:
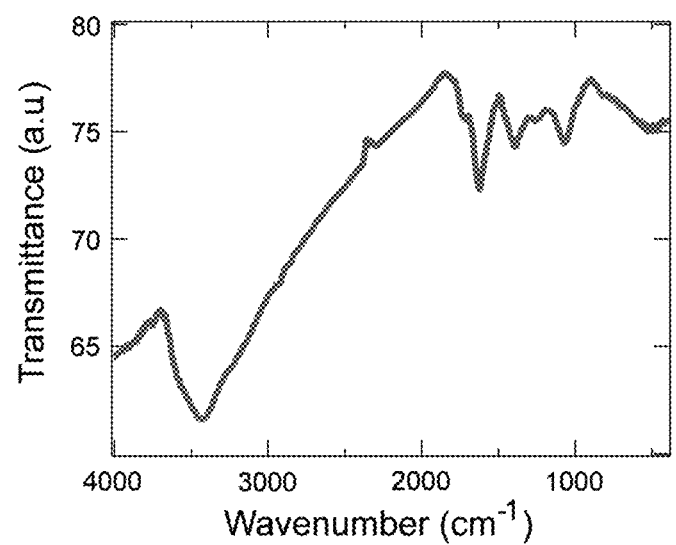
FIG. 10B is a graph showing Fourier Transform Infrared spectrum (FTIR) of air-dried GO laminates, displaying diverse functionalities such as (C—O) epoxy at 1260 $cm^{-1}$, (O—H) or C—O Carboxy at 1390 $cm^{-1}$, (C=O) Carbonyl and Carboxyl at 1718 $cm^{-1}$, and O—H hydroxyl at 3431 $cm^{-1}$.

FIG. 10B is a graph showing Fourier Transform Infrared spectrum (FTIR) of air-dried GO laminates, displaying diverse functionalities such as (C—O) epoxy at 1260 $cm^{-1}$, (O—H) or C—O Carboxy at 1390 $cm^{-1}$, (C=O) Carbonyl and Carboxyl at 1718 $cm^{-1}$, and O—H hydroxyl at 3431 $cm^{-1}$.

Figure 11A:
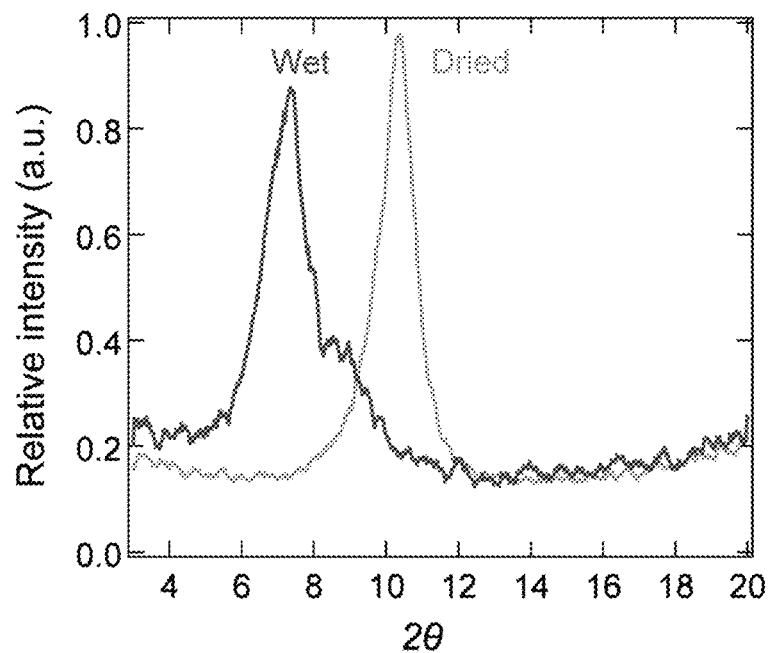
FIG. 11A is a graph showing X-ray diffraction (XRD) spectra comparison of dried and wet GO films. The interplane distance of GO reflection (100), was determined from a Rietveld refinement using conventional XRD data and program GSAS. Using the space group P6/mmm, a Rietveld refinement was performed with program GSAS (General Structure Analysis System) until discordance factors $R_{wp}$=7.00%, $R_p$=5.46%, $R_{Bragg}$=6.33% and $\chi^2$=1.138 2. The obtained cell parameters were a=b=10.517(3) Å and c=1.9 (1) Å. The investigated interlayer spacing of dried and wet GO by XRD was around 8.5754 Å and 12.1615 Å, respectively.

FIG. 11A is a graph showing X-ray diffraction (XRD) spectra comparison of dried and wet GO films. The interplane distance of GO reflection (100), was determined from a Rietveld refinement using conventional XRD data and program GSAS. Using the space group P6/mmm, a Rietveld refinement was performed with program GSAS (General Structure Analysis System) until discordance factors $R_{wp}$=7.00%, $R_p$=5.46%, $R_{Bragg}$=6.33% and $\chi^2$=1.138 2. The obtained cell parameters were a=b=10.517(3) Å and c=1.9(1) Å. The investigated interlayer spacing of dried and wet GO by XRD was around 8.5754 Å and 12.1615 Å, respectively.

Figure 11B:
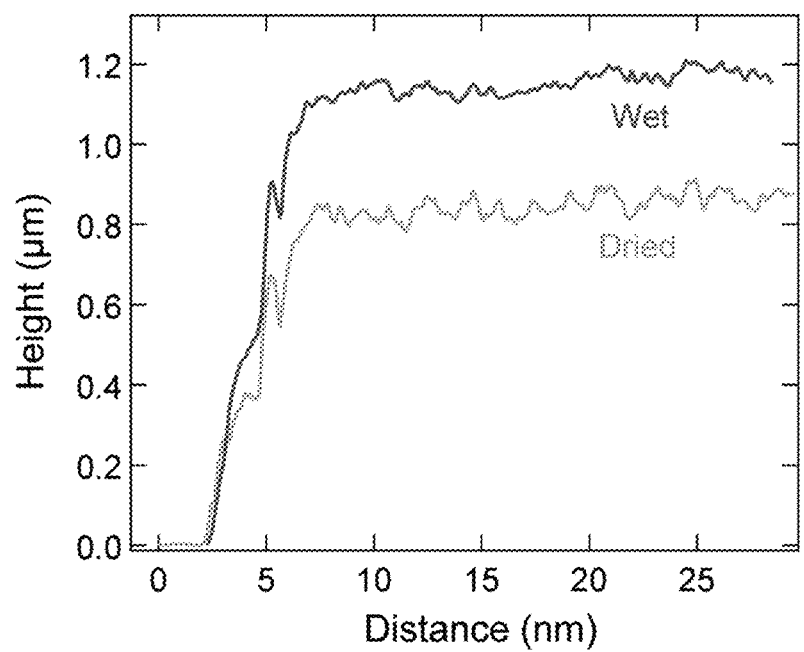
FIG. 11B is a graph showing respective height profile of dried and wet GO films, measured by in-situ liquid AFM showing similar increase in interlayer spacing after wetting.

FIG. 11B is a graph showing respective height profile of dried and wet GO films, measured by in situ liquid AFM showing similar increase in interlayer spacing after wetting.

Example 6: Quantitative Analysis of Ion Selectivity Across the Membranes

To describe ionic transport across the membrane, driven by voltage and concentration gradients, the inventors assumed that ions moved across the membrane independently and that the electric potential dropped linearly across the membrane. Using Boltzmann-Planck framework, the inventors derived so called Goldman-Hodgkin-Katz equations, connecting the current density J and membrane potential $V_m$ to the concentration and voltage gradient across the membrane:

$$J^{(n)} = P_{(n)} z_{(n)}^2 \frac{F^2 \Delta V}{RT} \frac{\left([S^{(n)}]_f - [S^{(n)}]_p \exp\left(\frac{z(n)F\Delta V}{RT}\right)\right)}{1 - \exp\left(\frac{z_s F \Delta V}{RT}\right)}, \quad (1)$$

$$J_{total} = J^+ + J^-, \quad (2)$$

$$V_m = \frac{RT}{F} \ln \frac{[S^+]_f + \left(\frac{P_-}{P_+}\right)[S^-]_p}{[S^+]_p + \left(\frac{P_-}{P_+}\right)[S^-]_f}, \quad (3)$$

where $J^{(n)}$ is ionic current density for cations (n=+), and anions (n=−), and $J_{total}$ is the total current density across the membrane. $P_{(n)}$ is membrane permeability and $z_{(n)}$ is the valence for each ionic specie n. $[S^{(n)}]_f$ and $[S^{(n)}]_p$ are ionic concentrations in the feed and permeate chambers, respectively. $\Delta V$ is the applied voltage, $V_m$ is the membrane potential, R is the universal gas constant (8.314 J·$K^{-1}$·$mol^{-1}$), F=9.6485×$10^4$ C·$mol^{-1}$ is Faraday's constant, T is the temperature.

The inventors were able to directly deduce the permeability ratio of the ions (and ion selectivity) from the membrane potential $V_m$. The inventors first measured the zero current potential $V_c$, the potential for which the total current through the membrane is zero. Subsequently, the membrane potential may be calculated by subtracting from $V_c$ the redox potential $V_{redox}$:

$$V_m = V_c - V_{redox} \quad (4)$$

The redox potential arose from the unequal chloride concentration at the two Ag/AgCl electrodes, and it gave the following relation:

$$V_{redox} = \frac{RT}{zF} \ln\left(\frac{\gamma_H c_H}{\gamma_L c_L}\right) \quad (5)$$

where $\gamma_H$ and $\gamma_L$ are the activity coefficients on the high concentration side (H) and the low concentration side (L) of the membrane, and $c_H$ and $c_L$ are concentrations of the chloride ion on the high concentration side (H) and the low concentration side (L) of the membrane.

To compare the results obtained with previous experiments, the inventors calculated molar flux density or permeation rate, p (mol-$cm^{-2}$-$h^{-1}$), which determined the classical solubility-diffusion model as:

$$p = P\Delta C \quad (6)$$

Example 7: Calculation of Ionic Conductance and Surface Charge Density

The ionic conductance (Go) of the membrane was deduced from the slope of I-V curves, measured in the Ohmic regime at voltages between −10 to +10 mV, for equal salt concentrations on both sides of the membrane.

The inventors put forth the simplest model that could predict variation of the membrane's conductivity with the surface charge on the GO flakes, without taking any assumption of the chemistry of GO flakes nor fluidic properties. The inventors assumed that the surface charge on the nanochannel walls increased the conductivity of nanochannels by increasing the local concentration of the counterions, to preserve the charge neutrality within the channel. The total conductivity of the channel was then given by:

$$G_0 = q(\mu_{K+} + \mu_{Cl-}) c_B N_A wh/l + 2\mu_{K+} \sigma_S h/l \quad (7)$$

where the first part of the equation corresponds to the Ohmic conductance due to the bulk concentration of ions, and the second part is the contribution from the excess counterions; q is the elementary charge; $\mu_{K+}$ and $\mu_{Cl-}$ are the ionic mobilities of cations and anions, respectively; $N_A$ is Avogadro's number; $c_B$ is the electrolyte's bulk concentration; as is the surface charge density; w and l are the width and length of channel, respectively.

Here the left term is the surface-charge governed conductance, which dominated at low salt concentration, and the right term is the bulk conductance dominant at high concentration. The approximated length of the single nanochannel across the membrane was derived from the thickness of the membrane. The width of the single channels was approximated to be the lateral sizes of the graphene oxide nanosheets. The Go was calculated by dividing the calculated Ohmic conductances by the number of channels. To obtain the number of channels, the inventors assumed that measured conductance at high concentration regime i.e. $c_B$=1 M, where the surface charges are mostly screened, was determined by bulk behaviors.

Example 8: pH-Dependent Ionic Conductances and Surface Charge Densities

Figure 12A:
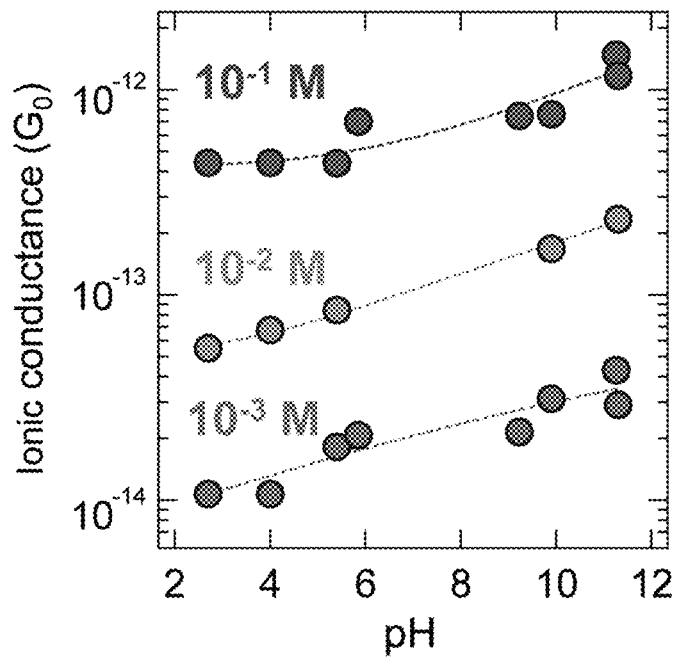
FIG. 12A is a graph showing ionic conductances across the single nanochannel of graphene oxide membranes, measured at three different KCl concentrations in the pH ranges of 2 to 12.
Figure 12B:
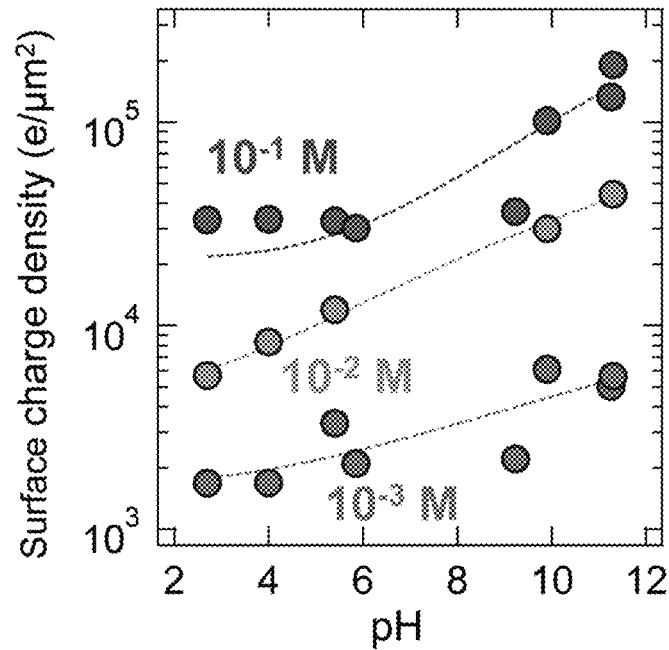
FIG. 12B is a graph showing surface charge densities as functions of salt concentration and pH in KCl. The charge densities were expressed in terms of the amount of charged carriers per area (e/μm²).

FIG. 12B illustrates the surface charge densities of graphene oxide nanochannels, which were calculated using the ionic conductances obtained at different pH values and molarities (FIG. 12A). The vanishing COO surface group due to the protonation at low pH led to a reduction in the surface charge. Dissociation of other groups present on the GO sheets also contributed to the pH-regulated surface charge variation.

Example 9: Effects of Excess Hydronium or Hydroxide Ions

Figure 13A:
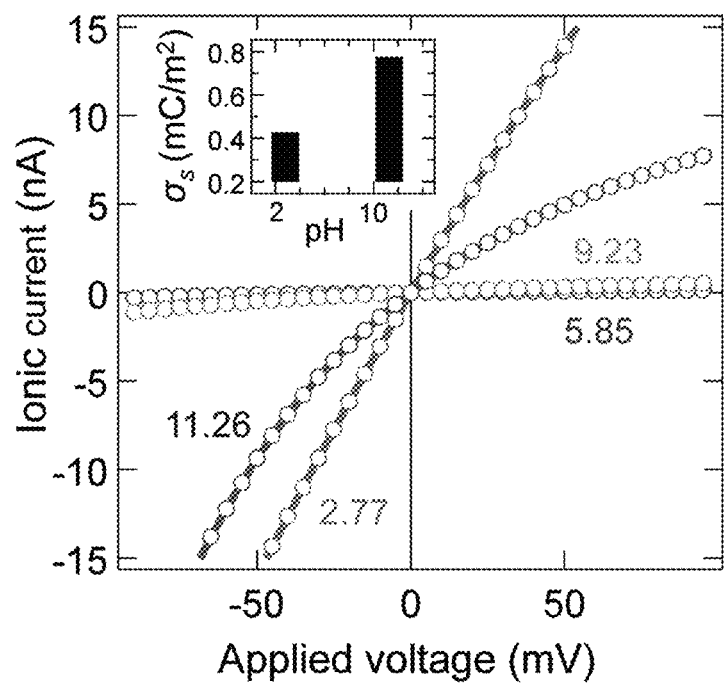
FIG. 13A is a graph showing pH-dependent current-voltage transport of electrolytes exclusive of solute KCl. Highly deprotonated nanochannel by hydroxide ions ($OH^-$) in KOH aqueous solution exhibited highly rectifying current profile compared to that of HCl. Inset is the surface charge density of GO channels evaluated at pH 2.77 and 11.26, respectively.
Figure 13B:
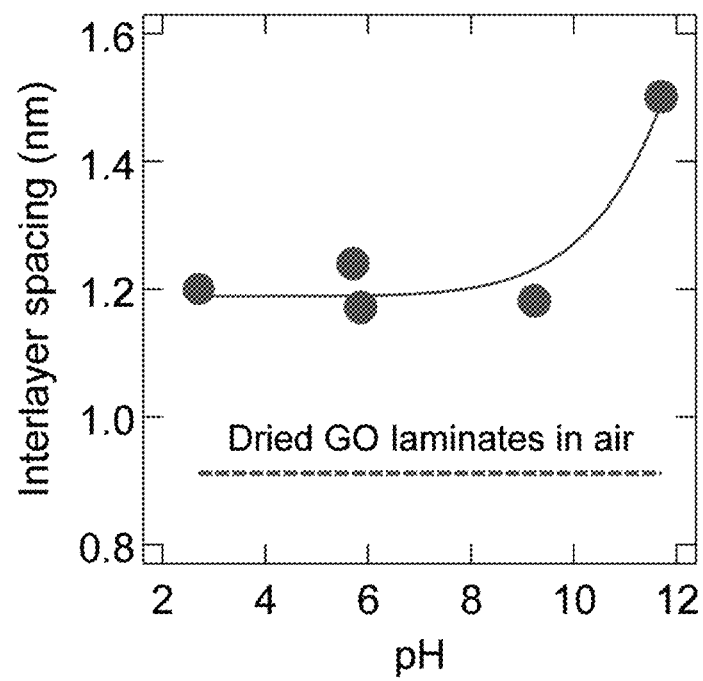
FIG. 13B is a graph showing pH-dependent variation of the interstitial spacing, obtained from membranes immersed in different pH solutions using in-situ AFM analysis.

The ionic currents associated with the excess hydronium ($H_3O^+$) or hydroxide ($OH^-$) ions were subtracted from all drift-diffusion and conductance measurements, since those excess species may significantly contribute to the ionic conductance as shown in FIG. 13A. In addition, increase of the interlayer spacing was observed at pH 11.7 by around 0.3 nm compared to those below pH 10 (FIG. 13B).

Example 10: pH-Dependent Drift-Diffusion Measurements

Figure 14A:
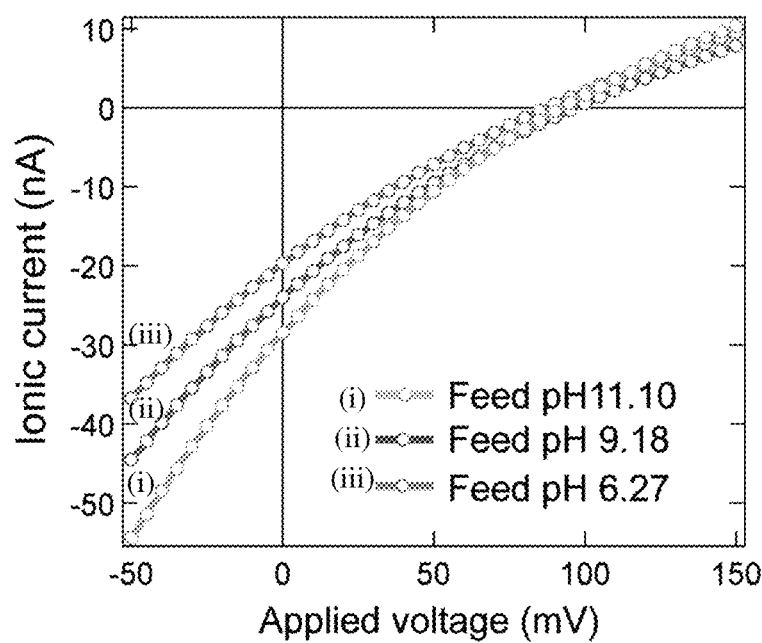
FIG. 14A is a graph showing current-voltage transport behaviors under asymmetric conditions ($10^{-1}$ M KCl and varying pH at values of (i) 11.10, (ii) 9.18 and (iii) 6.27 on the feed chamber, and $10^{-2}$M and constant pH of about 6 on the permeate chamber).

FIG. 14A is a graph showing current-voltage transport behaviors under asymmetric conditions ($10^{-1}$ M KCl and varying pH at values of 6.27, 9.18 and 11.10 on the feed chamber, and $10^{-1}$ M and constant pH of about 6 on the permeate chamber).

Figure 14B:
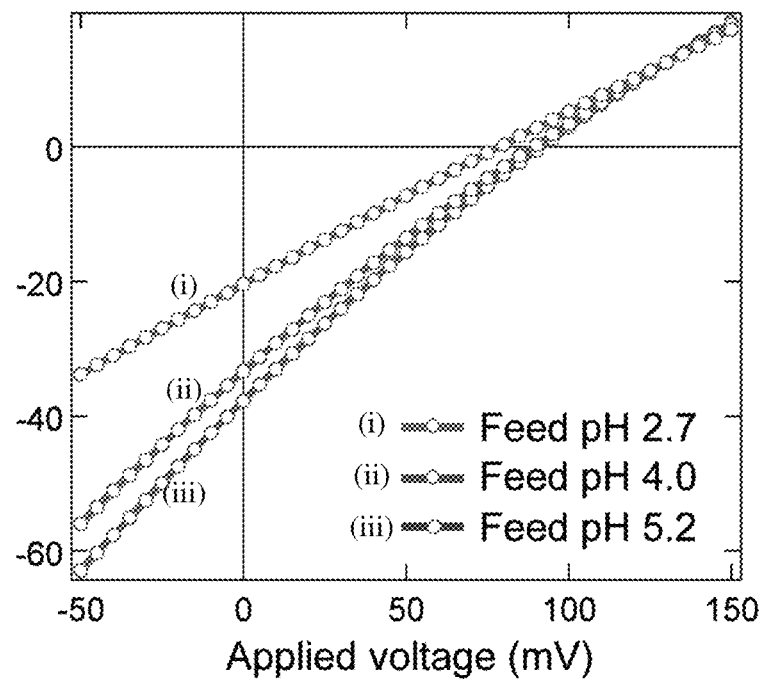
FIG. 14B is a graph showing current-voltage transport behaviors under asymmetric conditions ($10^{-1}$ M KCl and varying pH at values of (i) 2.7, (ii) 4.0 and (iii) 5.2 on the feed chamber, and $10^{-2}$M and constant pH of about 6 on the permeate chamber).

FIG. 14B is a graph showing current-voltage transport behaviors under asymmetric conditions ($10^{-1}$ M KCl and varying pH at values of 2.7, 4.0 and 5.2 on the feed chamber, and $10^{-2}$ M and constant pH of about 6 on the permeate chamber).

Example 11: Mean Field Model for Ion Transport in the Nanochannels

When the charged surface is immersed in an electrolyte, the electrostatic surface potential created by surface charges attracts counter-ions and repels co-ions. The region referred as the diffuse region of the electrical double layer has a higher density of counterions and a lower density of co-ions than the bulk. In this regime, the electrical potential decays exponentially with distance given by Debye length ($\lambda_D = \kappa^{-1}$)[10]

$$\kappa = \left( \frac{q^2 \sum_i n_0^{(i)} z_i^2}{\varepsilon_0 \varepsilon_r k_B T} \right)^{1/2} \tag{8}$$

where $n_0^{(i)}$ is the number density of ions of the type i in the bulk, $\varepsilon(=\varepsilon_0 \varepsilon_r)$ is the dielectric constant or permittivity, and $k_B$ is the Boltzmann constant. In a thin region between the surface and the diffuse layer, there is a layer of bound or tightly associated counterions, generally defined as the Stern layer.

This region is of the order of one or two solvated ions thick and also referred as the bound part of the double layer. In this region, it was assumed that the potential falls linearly from the surface to the interface between the diffuse layer and the Stern layer.

A graphene oxide nanocapillary was modeled as a rectangular channel formed by two separated sheets of graphene oxide separated by the distance h. The channel was delimited by the pristine graphene on top and bottom, and by oxidized regions of graphene on the sides. The Stern layer takes into account the finite size of the charged-surface functional groups. An electric field is applied along z-axis. The following equations were solved along the x-axis. The inventors considered there to be no friction between the water and top/bottom layers of pristine graphene.

The surface potential ($\phi$) on the charged walls in the electrolytes satisfies Poisson-Boltzmann equation as below $$\nabla^2 \Phi = -\frac{1}{\varepsilon_0 \varepsilon_r} \sum zqn \tag{9}$$

$$n = n_0 \exp\left(\frac{zq\Phi}{k_B T}\right) \tag{10}$$

By combining above two equations, $$\nabla^2 \phi = \frac{2qn_0}{\varepsilon_0 \varepsilon_r} \sinh\left(\frac{q\phi}{k_B T}\right) \tag{11}$$

Stern layer where showing linearly varying potential can be obtained as below with regard to boundary conditions $$\frac{d\Phi}{dx}(0) = 0$$

and $\Phi(R-\delta) = \Phi_D$.

$$\Phi_R - \Phi_D = \frac{\sigma \delta}{\varepsilon_0 \varepsilon_\delta} \tag{12}$$

In order to determine the surface charge density on the walls and the potential ($\Phi_D$), chemical reactions occurred on the oxidized surface regime, corresponding to the protonation of carboxyl or hydroxyl groups as below, were taken into account

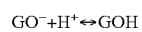

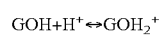

The equilibrium equations of the above reactions were defined by $$K = \frac{N_{GO} - [H^+]_0}{N_{GOH}} = 10^{-pK} \text{ and}$$

$$L = \frac{N_{GOH}[H^+]_0}{N_{GOH_2^+}} = 10^{-pL}$$

where the hydrogen activity at the surfaces is $$[H^+]_0 = [H^+]_{bulk} \exp\left(\frac{q\phi_R}{k_B T}\right)$$

and $N_t$ is the density of surface sites.

By taking into account the total surface density of active sites and surface charge density, the Behriens-Grier equation could be obtained $$10^{pL-pH}(\sigma - q\Gamma)\exp\left(-2\frac{q\phi_R}{k_BT}\right) + \sigma\exp\left(-\frac{q\phi_R}{k_BT}\right) + 10^{pB-pK}(\sigma + q\Gamma) = 0 \quad (13)$$

where the total surface density of activity sites ($\Gamma$) is $\Sigma N_i = \Sigma N_{GOH_2^+} + N_{GOH^-} + N_{GOH}$. Here, pK and pL do not correspond to bulk values for protonation of carboxyl and hydroxyl groups, they are effective equilibrium constants chosen as to match the experimental results.

And the Grahame equation was applied to calculate the surface charge density associated with the double layer potential $$\sigma(\Phi_D) = \frac{2k_BT\varepsilon_0\varepsilon_r}{q\lambda_D}\sinh\left(\frac{q\phi_D}{k_BT}\right) \quad (14)$$

By solving equations (12) and (13) self-consistently with regard to $$\Phi_R - \Phi_D = \frac{\sigma\delta}{\varepsilon_0\varepsilon_r},$$

it gives the surface charge density and the surface density of each species $N_i$ as a function of pH, electrolyte concentration, and the four chemical parameters, $\Gamma$, $\delta$, pK and pL.

In order to model the conductances across the membranes, the ion distribution and velocity field in the nanochannels was calculated with the Navier-Stokes equation and Boltzmann distribution, assuming that inertial and pressure terms are negligible and a no-slip condition at x=R.

$$n_+(x) = n_0\exp\left(-\frac{q\phi(x)}{k_BT}\right) \text{ and} \quad (15)$$

$$n_-(x) = n_0\exp\left(\frac{q\phi(x)}{k_BT}\right)$$

$$\rho\left(\frac{\partial \vec{u}}{\partial t} + \vec{u}\cdot\vec{\nabla}\vec{u}\right) = -\vec{\nabla}P + \eta\nabla^2\vec{u} + n\vec{E} \quad (16)$$

wherein inertial and pressure terms are negligible compared to viscosity and electrostatic force, and n $\vec{E} = -\varepsilon_0\varepsilon_r E_z \nabla^2\phi(x)\vec{z}$ is given. Therefore, $$\nabla^2(\eta u(x) - \varepsilon_0\varepsilon_r E_z\phi(x)) = 0 \quad (17)$$

with regard to the boundary conditions (no-slip boundary condition), $$\frac{du}{dx}(0) = 0$$

and u(R)=0.

The inventors obtained the solution as $$u(x) = \frac{\varepsilon_0\varepsilon_r E_z}{\eta}(\Phi(x) - \Phi_0) \quad (18)$$

The current was produced by the drifting of ions under the electric field and by the flow of water carrying the ions $$I_\pm^{drift} = 2hq\mu_\pm E_z\int_0^R n_\pm(x)dx \quad (19)$$

$$I_\pm^{diffusion} = \pm 2hq\int_0^R n_\pm(x)u(x)dx \quad (20)$$

Finally, the inventors were able to obtain the conductance as $$G = \frac{I_{total}}{V_z} \text{ with } V_z = E_z \times L_{channel}.$$

Example 12: Validation of the Analytical Continuum Models

In order to validate the model as shown in FIG. 15, the analysis was also carried out with a rectangular channel possessing charge polarity on planar surfaces and a cylindrical pore, respectively.

Figure 16A:
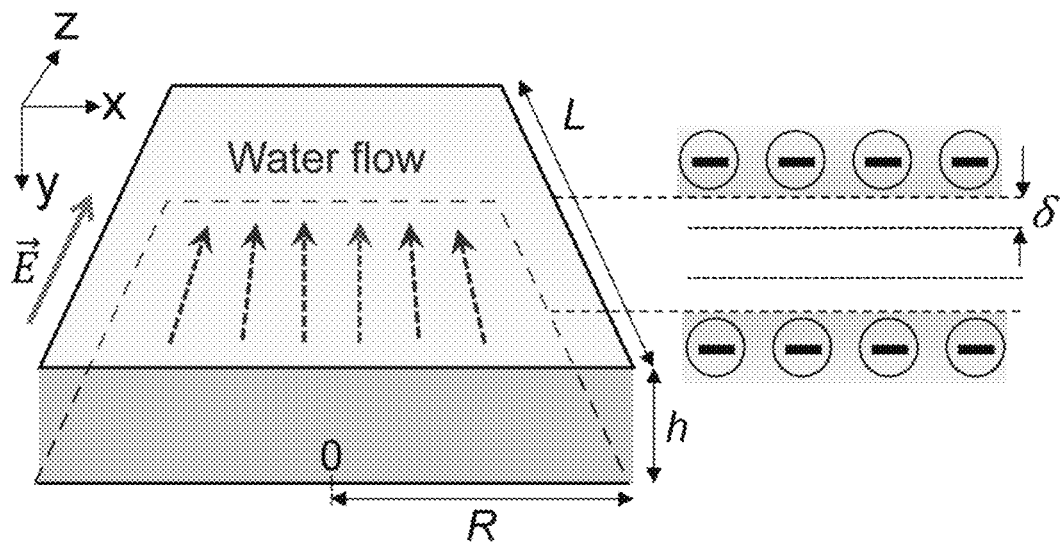
FIG. 16A is a schematic diagram depicting an analytical model with a rectangular pore possessing the surface charges on the top and bottom-sheets.
Figure 16B:
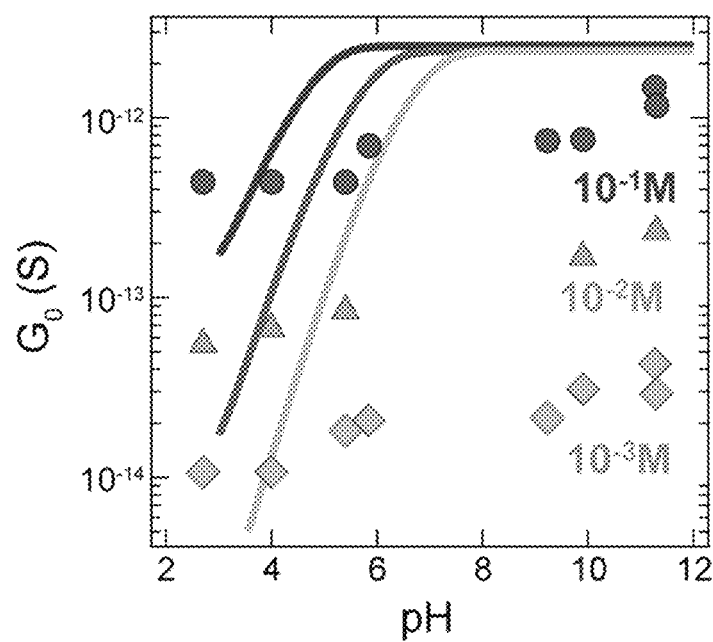
FIG. 16B is a graph showing calculated molarity by applying the parameters: =0.5 $nm^{-2}$, R=28 nm, $h_0$=0.9 nm, 6=1.3 nm, pK=0, pL=6, $L_{channel}$=0.4 mm, $\mu_+$=3.1×$10^{-7}$ m²/V-s, $\mu_-$=5.5×$10^{-8}$ m²/V-s. Solid lines show the calculated results from the analytical model, and the filled markers in the figure correspond to experimentally obtained data shown in FIG. 12A.
Figure 16C:
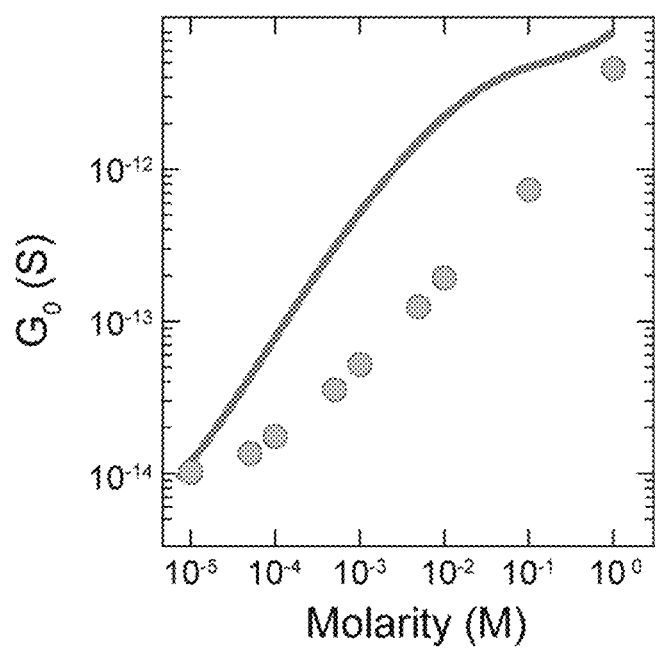
FIG. 16C is a graph showing calculated pH-dependent ionic conductances by applying the parameters: Γ=0.5 $nm^{-2}$, R=28 nm, $h_0$=0.9 nm, 6=1.3 nm, pK=0, pL=6, Lchannel=0.4 mm, $\mu_+$=3.1×$10^{-7}$ m²/V-s, $\mu_-$=5.5×$10^{-8}$ m²/V-s. Solid lines show the calculated results from the analytical model, and the filled markers in the figure correspond to experimentally obtained data shown in FIG. 9D.
Figure 17A:
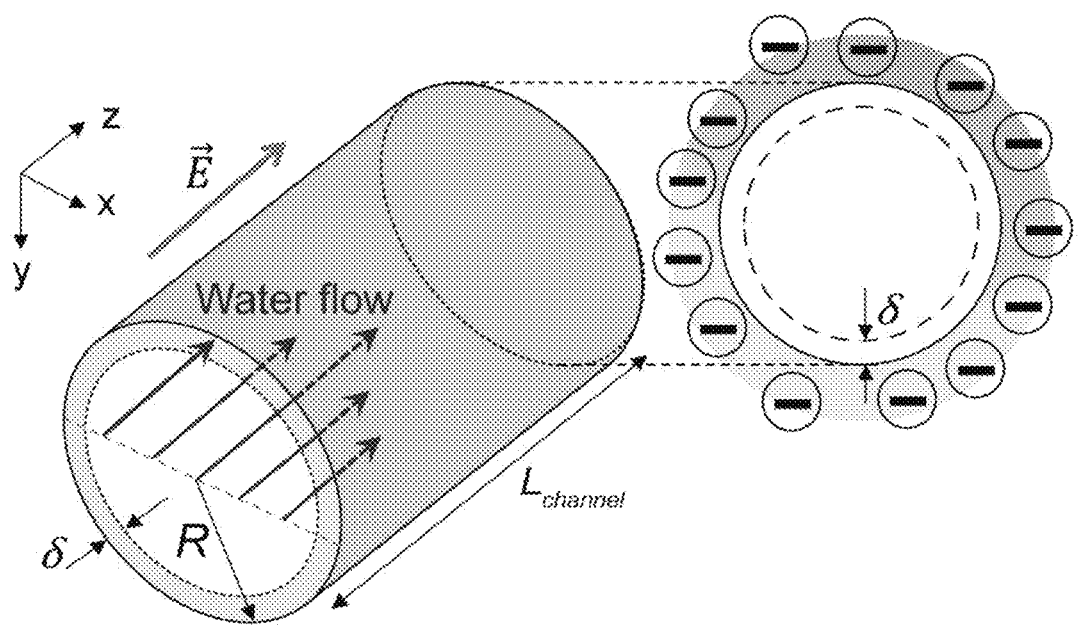
FIG. 17A is a schematic diagram depicting an analytical model of a cylindrical nanochannel with surface charges on circumference of cylindrical channel.
Figure 17B:
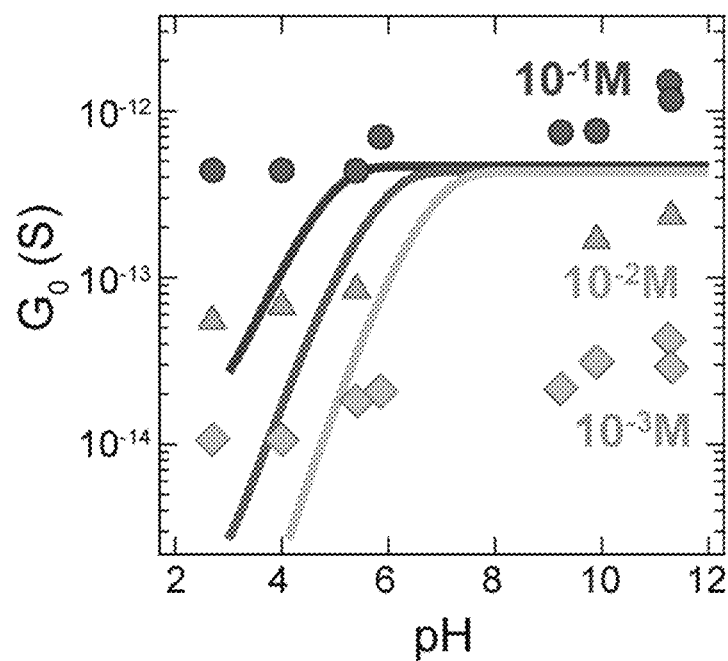
FIG. 17B is a graph showing calculated molarity by applying the parameters: $\Gamma=0.5$ nm$^{-2}$, $R_{pore}=0.45$ nm, $\delta=0.1$ nm, pK=0, pL=6, $L_{pore}=0.05$ mm, $\mu_+=3.1\times10^{-7}$ m$^2$/V-s, $\mu_-=5.5\times10^{-8}$ m$^2$/V-s. Solid lines show the calculated results from the analytical model, and the filled markers in the figure correspond to experimentally obtained data shown in FIG. 12A.
Figure 17C:
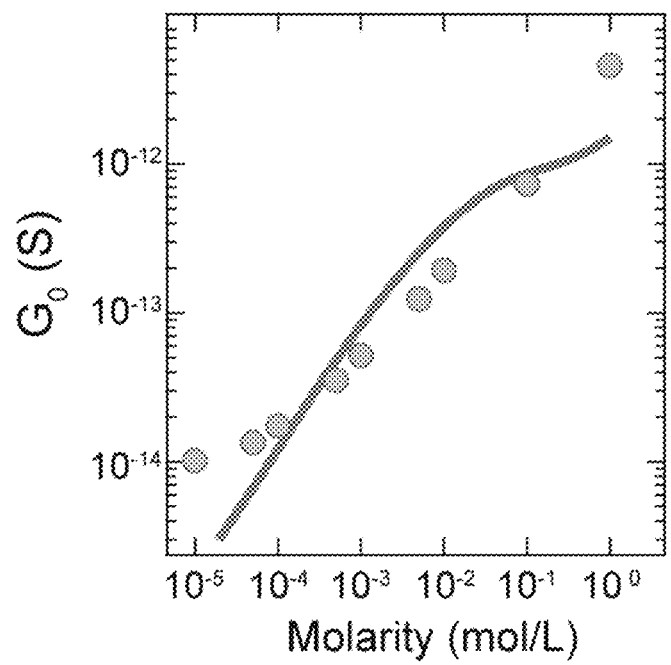
FIG. 17C is a graph showing calculated pH-dependent ionic conductance by applying the parameters: $\Gamma=0.5$ nm$^{-2}$, $R_{pore}=0.45$ nm, $\delta=0.1$ nm, pK=0, pL=6, $L_{pore}=0.05$ mm, $\mu_+=3.1\times10^{-7}$ m$^2$/V-s, $\mu_-=5.5\times10^{-8}$ m$^2$/V-s. Solid lines show the calculated results from the analytical model, and the filled markers in the figure correspond to experimentally obtained data shown in FIG. 9D.

FIG. 16 is a figure demonstrating the nanochannel with charge-polarized planar sheets. The highly concentrated counterions between two polarized nanosheets resulted in overestimated ionic conductance under electric field gradients compared to experimental values at different pH and molarities. Deviation in the ionic conductance indicates that dominant conducting pathways of ions in the graphene oxide membranes should consist of two dimensional, pristine graphene nanocapillaries with partially charged regions, not fully functionalized channels. The investigation was also carried out for a quasi-one dimensional cylindrical nanochannel with surface charges on circumference of cylindrical channel (FIG. 17).

These models were inconsistent with experimental observations.

Example 13: Ion Strength-Dependent Ionic Conductance and Cation Permselectivity

Figure 18A:
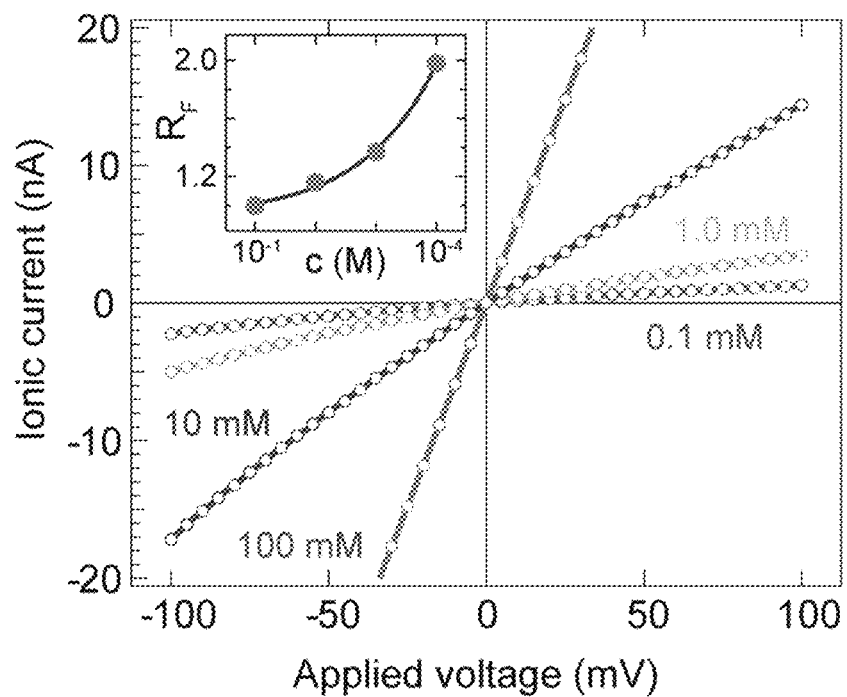
FIG. 18A is a graph showing current-voltage curves measured at different salt concentrations at around pH 5.5. Inset shows the rectification factor RF as a function of molarity, describing the relative ratio of the measured currents at scan voltages of ±80 mV.

FIG. 18A is a graph showing current-voltage curves measured at different salt concentrations at around pH 5.5. Inset shows the rectification factor RF as a function of molarity, describing the relative ratio of the measured currents at scan voltages of ±80 mV.

Figure 18B:
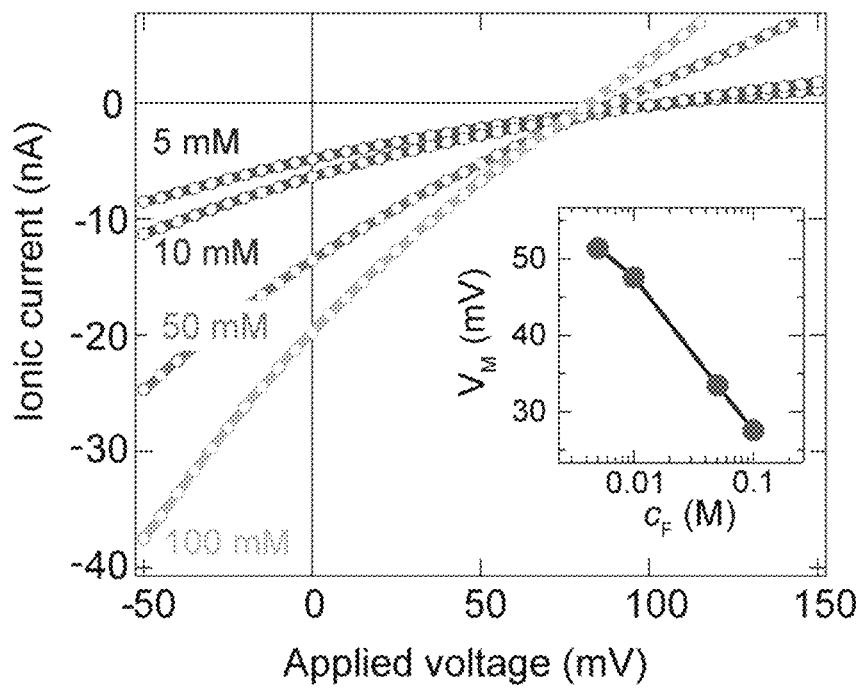
FIG. 18B is a graph showing current-voltage curves obtained from different feed concentrations and the constant concentration gradient of $G_{High}/C_{Low}=10$ at pH 5.5. Inset shows the increasing membrane potentials with dilution of the electrolytes (feed molarity CF), associated with the enhancement of the cation selectivity.

FIG. 18B is a graph showing current-voltage curves obtained from different feed concentrations and the constant concentration gradient of $G_{High}/C_{Low}=10$ at pH 5.5. Inset shows the increasing membrane potentials with dilution of the electrolytes (feed molarity CF), associated with the enhancement of the cation selectivity.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of separating hydrated ions from a fluid stream, the method comprising:
providing a plurality of graphene-based membranes, each graphene-based membrane comprising a stacked arrangement of layers of a graphene-based material, the layers of the graphene-based material defining one or more nanochannels between neighboring layers,
chemically engineering one or more of the plurality of graphene-based membranes to possess a desired electrical charge to increase a filtering efficiency for hydrated anions at substantially a same size of the one or more nanochannels for maintaining a desired flow though the graphene-based membrane, chemically engineering one or more of the plurality of the graphene-based membranes to possess a desired electrical charge to increase a filtering efficiency for hydrated cations at substantially a same size of the one or more nanochannels for maintaining a desired flow though the graphene based membrane, disposing the plurality of graphene-based membranes such that one or more adjacent cell pairs are provided, each cell pair comprising one graphene-based membrane for filtering the anions and one graphene-based membrane for filtering the cations separated by a passageway, and directing a fluid stream comprising the hydrated ions through the respective passageways for filtering of the hydrated ions from the fluid stream.

2. The method according to claim 1, wherein directing the fluid stream comprising the hydrated ions through the respective passageways is carried out with an electrical field.

3. The method according to claim 2, wherein the method of separating the hydrated ions from the fluid stream is applied to electrodialysis.

4. The method according to claim 1, wherein chemically engineering each graphene-based membrane comprises at least one of (i) varying polarity of the electrical charge; (ii) varying magnitude of the electrical charge, or (iii) arranging layers of opposite electrical charges in the stacked arrangement.

5. The method according to claim 1, wherein chemically engineering the graphene-based membranes comprises carrying out at least one of (i) a chemical substitution process on the graphene-based material, (ii) a reduction process on the graphene-based material, or (iii) contacting the graphene-based material with a liquid reagent and varying molarity and/or pH of the liquid reagent.

6. The method of claim 2, wherein the electric field is applied across the plurality of graphene-based membranes in a direction substantially perpendicular to a direction of the fluid stream.

7. The method of claim 1, wherein filtering the hydrated ions from the fluid stream comprises forming a dilute stream where the hydrated ions have been substantially removed and a concentrate stream containing the hydrated ions.

8. The method of claim 1, wherein the graphene-based membranes for filtering the anions and the graphene-based membranes for filtering the cations are arranged in an alternating arrangement between an anode and a cathode.

9. The method of claim 8, wherein the membrane positioned nearest to the anode assumes a positive charge and the membrane positioned nearest to the cathode assumes a negative charge.

* * * * *